United States Patent
Marlow et al.

(10) Patent No.: US 11,010,837 B1
(45) Date of Patent: *May 18, 2021

(54) ENHANCED UNMANNED AERIAL VEHICLES FOR DAMAGE INSPECTION

(71) Applicant: Allstate Insurance Company, Northbrook, IL (US)

(72) Inventors: Clint J. Marlow, Barrington, IL (US); Bryan Keith Corder, Gurnee, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,851

(22) Filed: Sep. 5, 2018

Related U.S. Application Data

(63) Continuation of application No. 14/700,440, filed on Apr. 30, 2015, now Pat. No. 10,102,586.

(51) Int. Cl.
*G06Q 40/08* (2012.01)
*B64C 39/02* (2006.01)

(52) U.S. Cl.
CPC ........... *G06Q 40/08* (2013.01); *B64C 39/024* (2013.01); *B64C 2201/123* (2013.01); *B64C 2201/127* (2013.01)

(58) Field of Classification Search
None
See application file for complete search history.

(56) References Cited

U.S. PATENT DOCUMENTS

| | | |
|---|---|---|
| 6,798,357 B1 | 9/2004 | Khan |
| 6,868,314 B1 | 3/2005 | Frink |
| 8,078,436 B2 | 12/2011 | Pershing et al. |
| 8,081,795 B2 | 12/2011 | Brown |
| 8,229,768 B1 | 7/2012 | Hopkins, III |

(Continued)

FOREIGN PATENT DOCUMENTS

| | | |
|---|---|---|
| CN | 201217502 Y | 4/2009 |
| CN | 101508344 A | 8/2009 |

(Continued)

OTHER PUBLICATIONS issuelab.org, Drones for Disaster Response and Relief Operations, Apr. 2015, entire document pertinent (Year: 2015).*

(Continued)

*Primary Examiner* — Elda G Milef
*Assistant Examiner* — Gregory S Cunningham, II
(74) *Attorney, Agent, or Firm* — Banner & Witcoff, Ltd.

(57) ABSTRACT

Systems and methods for performing insurance damage inspection by an unmanned aerial vehicle (UAV) are provided. A computing device may receive a request to inspect a vehicle, the request comprising a location of the vehicle. The computing device may identify a UAV from a plurality of UAVs that is located closest to the location of the vehicle from other UAVs in the plurality of UAVs. The computing device may instruct the UAV to travel to the location of the vehicle. The computing device may instruct the UAV to collect damage information on the vehicle using one or more onboard sensors of the UAV. The computing device may determine an amount of insurance payout to approve for repairs to the vehicle based on the damage information collected by the UAV.

5 Claims, 16 Drawing Sheets

(56) References Cited

U.S. PATENT DOCUMENTS

| | | | |
|---|---|---|---|
| 8,346,578 B1* | 1/2013 | Hopkins, III | G06Q 30/02 705/4 |
| 8,630,820 B2 | 1/2014 | Amis | |
| 8,650,106 B1 | 2/2014 | Hopkins, III | |
| 8,818,572 B1 | 8/2014 | Tofte et al. | |
| 9,218,626 B1* | 12/2015 | Haller, Jr. | G06Q 40/08 |
| 9,454,157 B1* | 9/2016 | Hafeez | G05D 1/104 |
| 9,894,327 B1 | 2/2018 | Jacob | |
| 10,102,590 B1* | 10/2018 | Farnsworth | G06Q 40/08 |
| 10,134,092 B1* | 11/2018 | Harvey | G06Q 40/08 |
| 10,713,726 B1* | 7/2020 | Allen | G06Q 40/08 |
| 2009/0265193 A1 | 10/2009 | Collins et al. | |
| 2010/0106395 A1 | 4/2010 | Gadler | |
| 2010/0174564 A1* | 7/2010 | Stender | G06Q 10/10 705/4 |
| 2012/0200601 A1 | 8/2012 | Osterhout et al. | |
| 2013/0226624 A1 | 8/2013 | Blessman et al. | |
| 2013/0287261 A1 | 10/2013 | Lee et al. | |
| 2013/0317865 A1 | 11/2013 | Tofte et al. | |
| 2014/0118140 A1 | 5/2014 | Amis | |
| 2014/0140575 A1 | 5/2014 | Wolf | |
| 2014/0166817 A1 | 6/2014 | Levien et al. | |
| 2014/0202800 A1 | 7/2014 | Breed | |
| 2014/0245210 A1 | 8/2014 | Battcher et al. | |
| 2014/0279707 A1 | 9/2014 | Joshua et al. | |
| 2015/0106010 A1 | 4/2015 | Martin et al. | |
| 2015/0363717 A1 | 12/2015 | Lim | |
| 2016/0063642 A1* | 3/2016 | Luciani | G06Q 40/08 705/4 |
| 2016/0236638 A1* | 8/2016 | Lavie | H04N 7/185 |
| 2016/0307449 A1* | 10/2016 | Gordon | G08G 5/0069 |

FOREIGN PATENT DOCUMENTS

| | | |
|---|---|---|
| CN | 101833870 A | 9/2010 |
| CN | 103413444 A | 11/2013 |
| CN | 103809599 A | 5/2014 |
| CN | 103812052 A | 5/2014 |
| EP | 1496484 A1 | 1/2005 |
| WO | 2014080388 A2 | 5/2014 |

OTHER PUBLICATIONS

Francis, etal., Drones: The Insurance Industry's Next Game-Changer?, Oct. 2014, Cognizant, entire document pertinent (Year: 2014).*
Jul. 20, 2016·U.S. Notice of Allowance—U.S. Appl. No. 14/700,469.
Mar. 28, 2016—U.S. Non-Final Office Action—U.S. Appl. No. 14/700,469.
Jun. 19, 2017—U.S. Non-Final Office Action—U.S. Appl. No. 15/282,237.
Jun. 8, 2018—U.S. Final Office Action—U.S. Appl. No. 15/282,237.
The Future of Drone Use in the Insurance Industry—Denise Johnson—Mar. 3, 2014.
Drones may be coming to a fender-bender or storm near you—Kevin Moore—Apr. 1, 2014.
Property damage litigation, Insurance claims and Inspection—MiamiAerial—Apr. 10, 2012.
FAA has insurers hovering over the use of drones—Small Insurance Blog—Mar. 13, 2014.
Technology Creates Insurance Challenges—McGrath Insurance Group, Inc.—Sep. 16, 2014.
Insurance Coverage for Unmanned Aerial Vehicles—UAV Unmanned Aircraft Systems—UAS Civil Drone and RPAS-Transport Risk Management, Inc.—Sep. 16, 2014.
Drones Over Washington DC!—G&C Tire and Auto Service—Apr. 1, 2014.
Rise of the Drones—Risk & Insurance—Mar. 2014.
Oct. 5, 2018—U.S. Notice of Allowance—U.S. Appl. No. 15/282,237.
Aug. 20, 2019—U.S. Non-Final Office Action—U.S. Appl. No. 16/241,205.

* cited by examiner

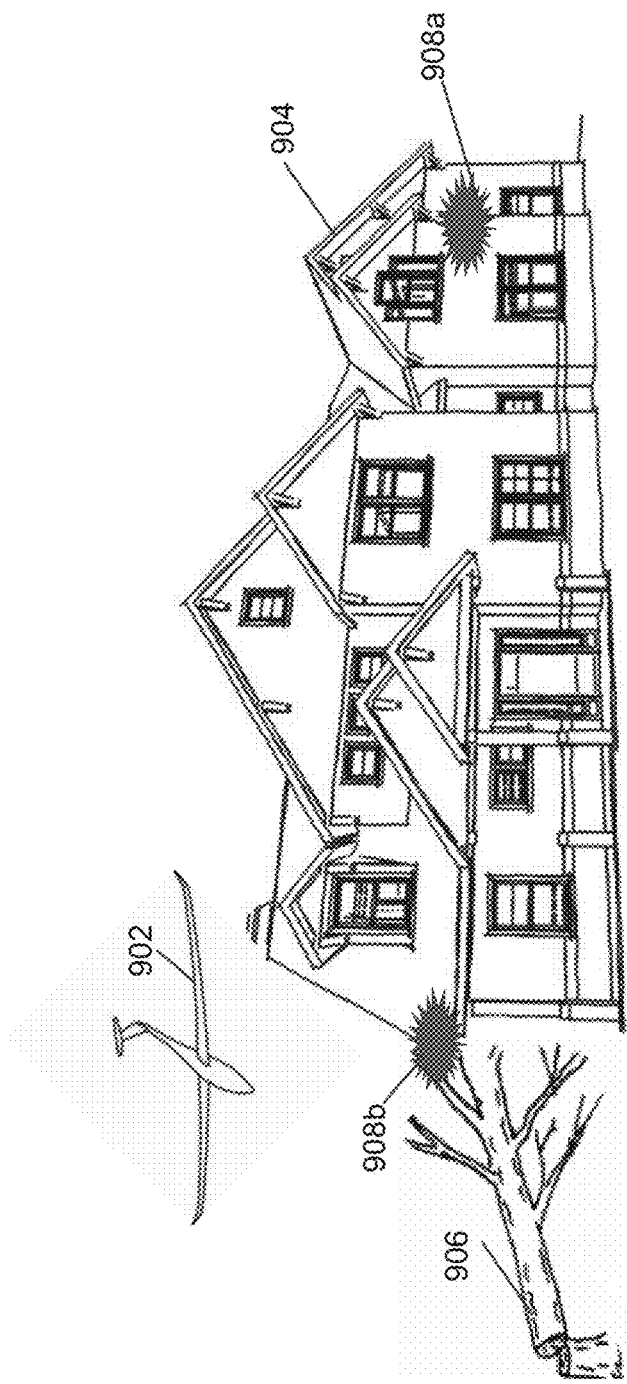

ENHANCED UNMANNED AERIAL VEHICLES FOR DAMAGE INSPECTION

CROSS REFERENCE TO RELATED APPLICATIONS

This application is a continuation of and claims priority to co-pending U.S. application Ser. No. 14/700,440, entitled, "Enhanced Unmanned Aerial Vehicles for Damage Inspection," and filed Apr. 30, 2015, which is incorporated herein by reference in its entirety.

TECHNICAL FIELD

Aspects of the disclosure generally relate to an enhanced unmanned aerial vehicle (UAV) for, inter alia, inspecting property damage. In particular, various aspects described herein relate to dispatching unmanned aerial vehicles (UAVs) to inspect damage to insurance policyholders' properties and making insurance decisions from the information collected by the UAV

BACKGROUND

Insured parties pay premiums for coverage of potential liabilities including damage to the insured property. In the event of damage to the insured property, an insurance claims agent and/or claims adjuster is dispatched to verify and asses the scope and nature of the damage to the insured property. However, there are times when the damaged portion of the property is inaccessible to the human insurance agent/adjuster. Sometimes the insurance policyholder may not be able to report proof of the damage and an insurance agent may not be a cost effective option for damage inspection. In other situations, the insurance agent/adjuster may not be able to accurately determine the degree of damage to the insured property. In several situations, the human insurance agent/adjuster may not have the necessary tools or the necessary skills to determine and report all types of property damage.

A human insurance agent may also not be familiar with the insurance history of the property that he is investigating or have the necessary background information needed to properly assess the damage to a property and determine any present risks of future damage based on the condition of the insured property. Accordingly, the claim estimation performed by an insurance provider from such incomplete information may not accurately capture all the potential risks of damage to the property as well as capture all of the damage to this property.

Furthermore, an insurance agent often cannot be immediately dispatched to perform scene investigation at the scene of an incident. There is often useful information that can be collected only at the scene of the incident that is often not captured in insurance claims calculation.

Furthermore, numerous conventional systems do not facilitate insurance decisions to be made in real time while the damage information is acquired from the insured property. Therefore, there is room for improvement in existing systems and processes including in areas such as the insurance claims investigation process to capture all damage information for an insured property that an insurance agent is otherwise not able to capture, assess potential risk of future damage, collect damage information at the scene of an incident, and/or process insurance claims during in real time as the claims investigation.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems and methods for collecting damage information from insured vehicles of insurance policyholders. A computing device may receive a request to inspect a vehicle which includes a location of the vehicle. The computing device may identify an unmanned aerial vehicle (UAV) from a plurality of UAVs that is located closest to the location of the vehicle from other UAVs in the plurality of UAVs. The computing device may instruct the UAV to travel to the location of the vehicle and to collect damage information on the vehicle using one or more onboard sensors of the UAV. The computing device may determine an amount of insurance payout to approve for repairs to the vehicle based on the damage information collected by the UAV. In order to determine the amount of insurance payout to approve further comprises, the computing device may determine the insurance account with which the vehicle is associated, identifying an insurance policy coverage of the insurance account with respect to the vehicle, and determine which repairs are covered by the insurance policy coverage by examining the damage information collected by the UAV. The computing device may determine an amount of insurance payout to approve for repairs to the vehicle based on the information collected by the UAV.

In some aspects, the computing device may receive damage information for the vehicle from the UAV. The computing device may identify one or more repairs that the vehicle needs from the damage information. The computing device may instruct the UAV to perform duties of an insurance claims adjuster.

In some aspects, the request to inspect the vehicle is received in response to a determination that the vehicle has been involved in a vehicle collision, and the location of the vehicle corresponds to a location of the vehicle collision. The computing device may determine that the vehicle collision is in a vicinity of a traffic intersection from the location. In response to determining that the vehicle location is in the vicinity of the traffic intersection, the computing device may instruct the UAV to monitor a traffic light at the traffic intersection to collect traffic light timing information. The computing device may receive the traffic light timing information from the UAV. The computing device may determine that at least one vehicle involved in the vehicle collision committed a traffic violation from the traffic light timing information. The computing device may instruct the UAV to collect a plurality of different types of information at the location of the vehicle collision using the one or more onboard sensors of the UAV, wherein the plurality of different types of information collected by the UAV comprises optical image data, infrared image data, hyperspectral image data, LIDAR data, thermal sensor data, chemical sensor data, event data recorder data, and audio data. The computing device may receive additional information from the UAV indicating that one or more safety features of the vehicle were activated in the vehicle collision. The computing device may adjust the insurance policy decision based on the additional information.

In some aspects, the computing device may receive a claims request for the vehicle and determine that instructing the UAV to collect the information about the condition of the vehicle is a cost effective option to respond to the claims request. The computing device may determine an insurance account with which the vehicle is associated and may identify an insurance policy coverage of the insurance account with respect to the vehicle. The computing device may determine at least one aspect of the vehicle for which to capture detailed information based on the insurance policy coverage for the vehicle and the claims request. The computing device may instruct the UAV to use one or more of the onboard sensors to collect the detailed information for the at least one determined feature of the vehicle.

In some aspects, the determination to inspect the vehicle may be made upon receiving an indication from a policyholder associated with the vehicle that the vehicle has been submitted to a repair shop. In response to determining a location of the repair shop from the indication received from the policyholder, instruct the UAV to travel to the location of the repair shop to assess damage of the vehicle before the vehicle is repaired. The computing device may receive a report from the repair shop identifying the damages that the repair shop claims to have fixed in the vehicle. The computing device may determine that the report from the repair shop is claiming to have fixed one or more damage to the vehicle that is not identified in the information captured by the UAV about the condition of the vehicle before the vehicle was repaired.

Another aspect of the disclosure relate to systems and methods for receiving first information about a condition of a vehicle of an insurance policyholder at a first time. The computing device may determine an insurance risk associated with the vehicle based on the first information. The computing device may instruct the UAV to collect second information about the condition of the vehicle at a second time, wherein the UAV is instructed to collect information associated with the determined insurance risk. The computing device may generate an insurance policy decision for the insurance policyholder based on the first information and the second information collected by the UAV. The first information about the condition of the vehicle is received at a first time at which the vehicle was inspected by an approved claims agent. The second time may occur after the first time and the UAV may be instructed to use one or more onboard sensors of the UAV to collect detailed information on at least one aspect of the vehicle identified by the insurance risk. Determining the insurance risk may comprise examining the received first information to identify any aspects of the vehicle that are not in compliance with an insurance coverage policy associated with the insurance policyholder. The computing device may identify at least one aspect of the vehicle that needs to be fixed in order to be compliant with the insurance coverage policy. Instructing the UAV to collect the second information about the condition of the vehicle may comprise determining a location of the vehicle and instructing the UAV to travel to the location of the vehicle. Generating the insurance policy decision may comprise identifying an insurance policy coverage for the vehicle associated with the insurance policyholder and determining one or more actions indicated by the insurance policy coverage that are associated with the insurance risk and the second information collected by the UAV.

Another aspect of the disclosure relates to systems and methods for collecting damage information from insured real estate properties of insurance policyholders. The computing device may instruct a UAV to travel to a real estate property corresponding to a damage incident and to collect information on at least one aspect of the real estate property using one or more onboard sensors of the UAV. In response receiving the information from the one or more sensors of the UAV, the computing device may identify a type of damage incurred on the at least one aspect of the real estate property based on the information and instruct the UAV to deliver a payment to an insurance policyholder associated with the real estate property for the identified type of damage. Instructing the UAV to collect information on the at least one aspect may comprise instructing the UAV to identify damage to the at least one aspect of the real estate property and to use or more onboard sensors to collect different types of data based on the damage. The computing device may instruct the UAV to identify a plurality of vantage points with respect to the at least one aspect of the real estate property and to collect information on the at least one aspect from each of the plurality of the identified vantage points. The computing device may receive the information on the at least one aspect of the real estate property collected by the one or more onboard sensors of the UAV. The computing device may identify a type of damage incurred on the at least one aspect of the real estate property based on the information collected by the UAV and may determine whether the insurance policyholder has insured the real estate property for the identified type of damage. In response to determining that the insurance policyholder has insured the real estate property for the identified type of damage, the computing device may identify insurance account history of the insurance policyholder and may identify an amount of payout that the insurance policyholder is eligible to receive for the identified type of damage based on at least one of the insurance account history and extent of the identified damage from the information collected by the UAV.

In some aspects, the UAV may be instructed to travel to the real estate property upon receiving a claims request from the insurance policyholder for the at least one aspect of the real estate property. The computing device may determine that the insurance policyholder is unable to submit proof identifying damage inflicted on the at least one aspect of the real estate property. The computing device may identify the UAV from a plurality of UAVs, by identifying which of the plurality of UAVs is located closest to the real estate property. The one or more of the plurality of UAVs may be instructed to perform duties of an insurance claims adjuster.

In some aspects, the computing device may receive a plurality of different types of information collected by the one or more onboard sensors of the UAV. The computing device may determine an insurance underwriting decision based on the plurality of different types of information captured by the UAV. The computing device may determine that the real estate property needs to be inspected upon receiving a claims request for the real estate property, identifying one or more available methods to inspect the real estate property, and determining that instructing the UAV to collect the information about the condition of the real estate property is a most cost effective method, of the one or more available methods, to inspect the real estate property. Instructing the UAV to collect information about a condition of the real estate property may comprise determining a location of the real estate property and instructing the UAV to travel to the location of the real estate property. Determining the insurance underwriting decision may further comprise determining an insurance account with which the real estate property is associated, identifying an insurance policy coverage of the insurance account with respect to the real estate property, analyzing the plurality of different types of information collected to identify damage inflicted on the real estate property, and determining an amount of payout that the insurance policy coverage is eligible to cover for the identified damage to the real estate property.

In some aspects, the computing device may receive a claims request identifying at least one aspect of the real estate property that has been damaged. The computing device may instruct the UAV to identify damage to the at least one aspect of the real estate property and may instruct the UAV to use or more onboard sensors to collect different types of data based on the damage. The computing device may determine at least one aspect of the real estate property that been damaged and may instruct the UAV to identify a plurality of vantage points with respect to the at least one aspect of the real estate property. The computing device may instruct the UAV to collect information on the at least one aspect from each of the plurality of the identified vantage points.

Another aspect of the disclosure relates to methods and systems for receiving first information about a condition of a real estate property of an insurance policyholder at a first time. The computing device may determine an insurance risk associated with the real estate property based on the first information. The computing device may instruct the UAV to collect second information about the condition of the real estate property at a second time, wherein the UAV is instructed to collect information associated with the determined insurance risk. The computing device may determine a payment amount that the insurance policyholder is eligible to receive for the real estate property based on the first information and the second information collected by the UAV. Receiving the first information may comprise determining that the real estate property is located on a path of the UAV travelling to another destination. The computing device may instruct the UAV to collect information on the real estate property as the UAV flies over the real estate property. The computing device may receive the information collected on the real estate property by the UAV at the first time as the UAV flies over the real estate property. The second time may occur after the first time and the UAV may be instructed to use one or more onboard sensors of the UAV to collect detailed information on at least one aspect of the real estate property identified by the insurance risk. Determining the insurance risk may include examining the received first information to identify any aspects of the real estate property that are not in compliance with an insurance coverage policy associated with the insurance policyholder and identifying at least one aspect of the real estate property that needs to be fixed in order to be compliant with the insurance coverage policy. Instructing the UAV to collect the second information about the condition of the real estate property may include determining a location of the real estate property and instructing the UAV to travel to the location of the real estate property. Determining the payment amount that the insurance policyholder is eligible to receive for the real estate property may comprise identifying an insurance policy coverage for the real estate property associated with the insurance policyholder. The computing device may analyze the second information to identify damage inflicted on the real estate property. The identified damage may be associated with at least one aspect of the real estate property identified by the determined insurance risk. The computing device may determine the payment amount that the insurance policy coverage is eligible to provide for the identified damage to the real estate property.

These and other features and advantages of the disclosure will be apparent from the additional description provided herein.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIGS. 9A-9D illustrate an example environment in which a UAV performs damage assessment on an insured real estate property according to one or more aspects described herein.

DETAILED DESCRIPTION

In the following description of the various embodiments, reference is made to the accompanying drawings, which form a part hereof, and in which it is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
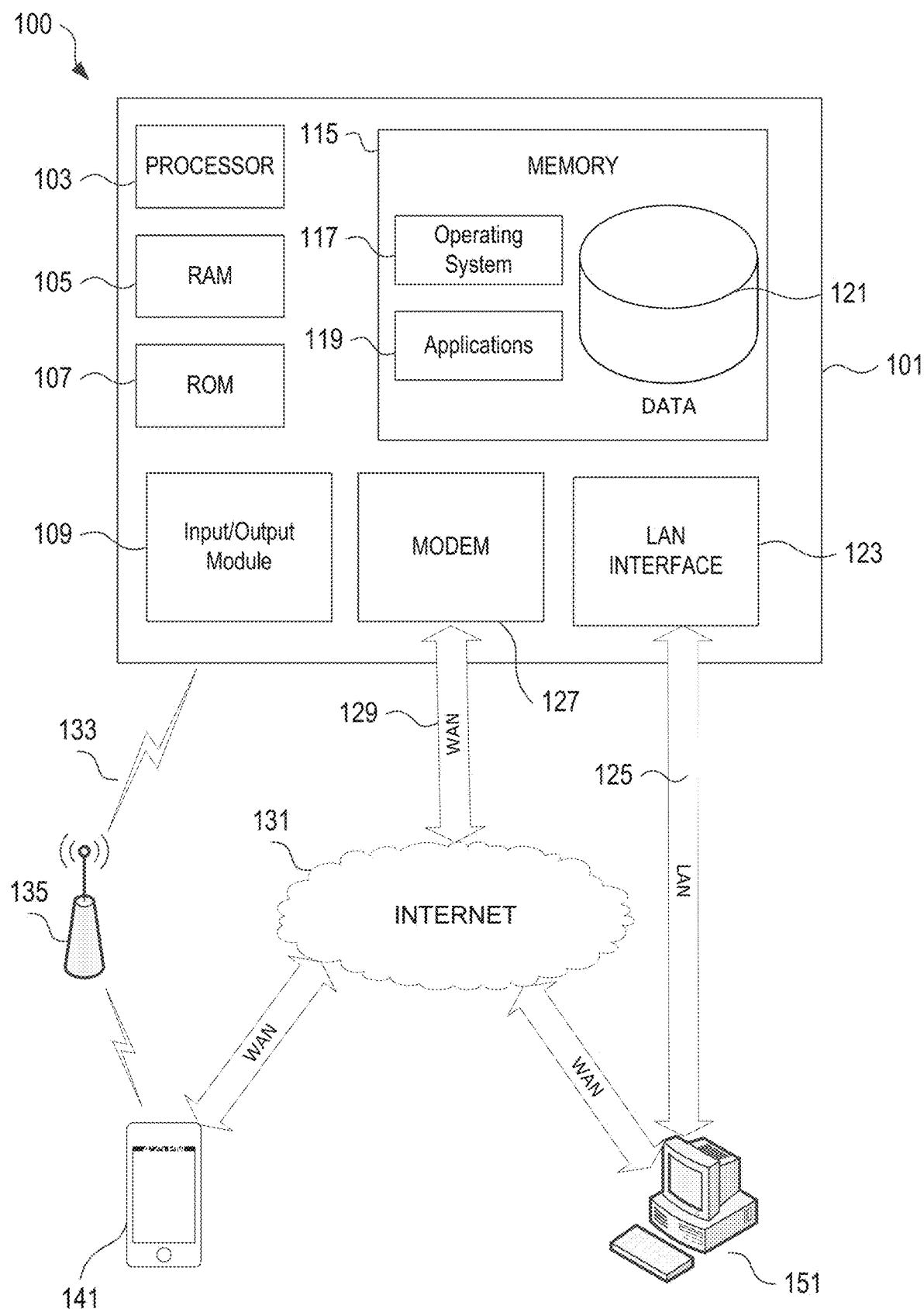
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as various servers or systems, such as an insurance claim coverage system, configured as described herein for receiving data associated with one or more users having primary and secondary insurance, determining whether the secondary insurance provides coverage for a service for which a claim was submitted to the primary insurance, and notifying the user of the potential eligibility for coverage.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with a plurality of users, receive insurance claim information associated with the plurality of users, determine whether the plurality of users are eligible for coverage under a secondary insurance and provide a notification to the users of the eligibility.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the insurance claim coverage system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, and wireless mesh networks, is presumed, and the various computing devices and system components described herein may be configured to communicate using any of these network protocols or technologies.

Additionally, one or more application programs 119 used by the insurance claim coverage system 101 may include computer-executable instructions (e.g., insurance data analysis, etc.) for receiving data claims submitted to a primary insurance provider, analyzing the data to whether the services for which the claims were submitted, or a portion thereof, may be covered by a secondary insurance and/or providing a notification to the user of the potential eligibility for coverage.

Device 101 in FIG. 1 is an example embodiment of an insurance server that communicates with various computing devices to collect information on insured property to generate and/or adjust insurance underwriting decisions or other policy changes to an insurance policyholder user's account. The insurance server may gather insurance information for its various policyholders from multiple different computing devices and collect current damage information using various means for deploying agents and/or autonomous means for performing scene investigations (e.g., unmanned aerial vehicles). The insurance server may also monitor or communicate with other servers that monitor the insurance history of a policyholder and calculate risks, underwriting decisions, and policy changes to provide the current damage information to make these insurance decisions.

In other embodiments, the device 101 may include fewer or more elements. For example, the device 101 may use the processor(s) 103 to perform functions of the device 101, and thus, might not include a separate processor or hardware for the device 101. Additionally, or alternatively, the device 101 may be a mobile device (e.g., a smartphone, tablet, and the like) configured to communicate with one or more sensors that collects information on insured property and relay that information back to a remote server that contains account information on the insurance policyholder associated with the insured property that the information is being collected about. Device 101 may also include various other components, such as a battery, speaker, and/or antennas (not shown). Also, the device 101 may be a telematics device and/or a vehicle computing device (either installed by a vehicle manufacturer or as an aftermarket part) having vehicle compatible elements, such as a port for an on-board diagnostic connector or ports for other vehicle sensors (e.g., tire pressure sensors, engine temperature sensors, and the like). For example, the device 101 may be a vehicle's computer or a device plugged into the vehicle's computer for use in vehicle telematics.

The systems described herein may be used by an insurance company to perform scene investigation and detect damages to insured properties of users who have an insurance account with the insurance company. Although many examples herein will be described as being used in conjunction with an insurance company, the systems and methods described herein may be used by or with other entities or types of entities without departing from the spirit of the disclosure. For instance, the system may be implemented by a property inspection agency and/or a property appraisal agency.

Figure 2:
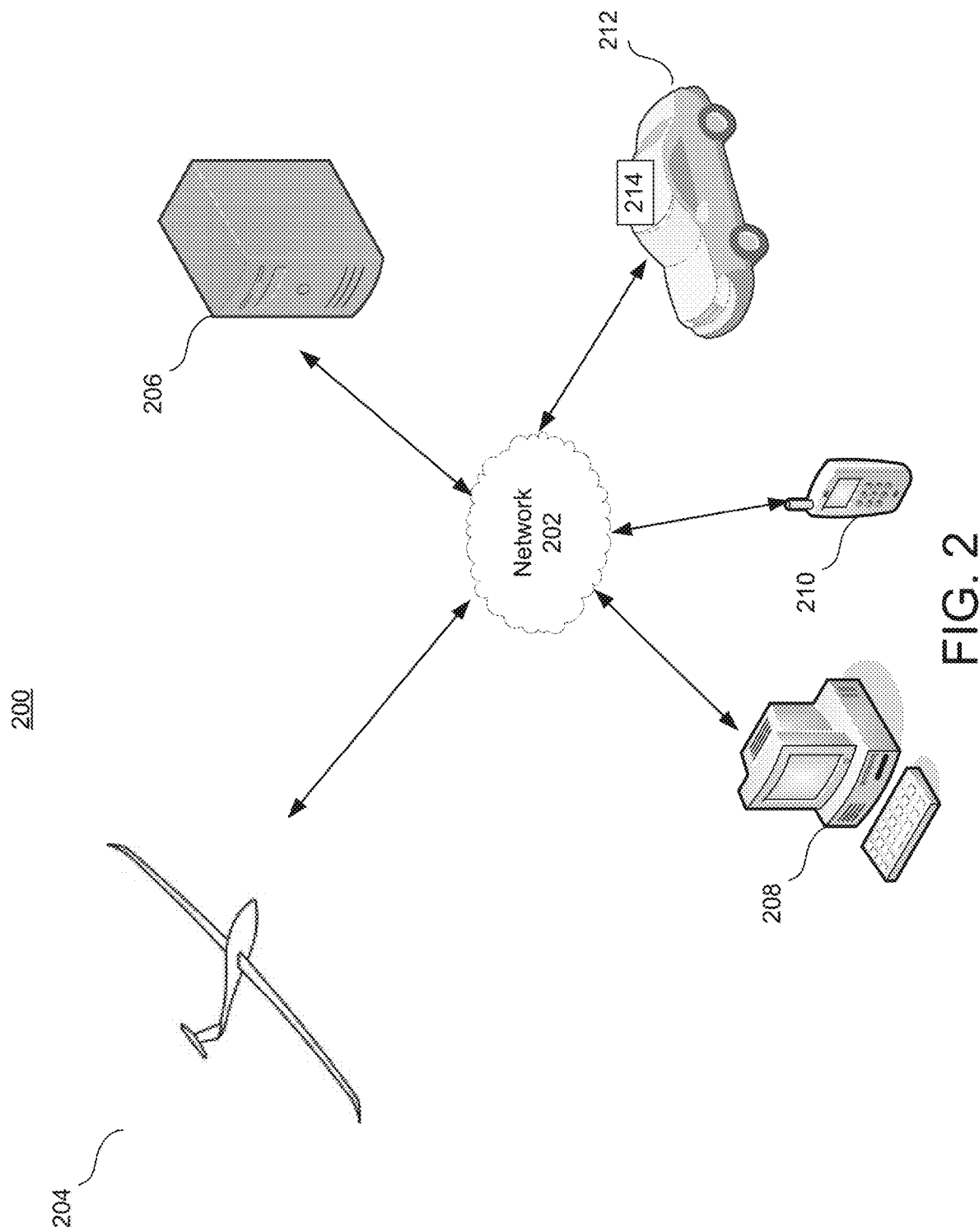
FIG. 2 illustrates an insurance data collection system in which information on insured property may be collected according to one or more aspects described herein.

The computerized methods for collecting damage information from an insured property and making an insurance policy decision as disclosed herein may be implemented on one or more devices 101 used in various network environments. FIG. 2 illustrates an example network environment 200 for implementing methods in accordance with aspects of the present disclosure.

As shown in FIG. 2, the network environment 200 may include a network 202 configured to connect to a UAV 204, insurance server 206, computing device 208, mobile device 210, vehicle 212, and telematics device 214. The insurance server 206 may be the same as or at least similar to the computing device 101 described above with reference to FIG. 1. Collectively, these specialized computing devices may form at least a part of an insurance damage inspection and processing system. Although only one of each of the components 204, 206, 208, 210, 212, and 214 are shown in FIG. 2, it is understood that there may be any number of components 204, 206, 208, 210, 212, and 214 in the network environment 200.

The network 202 may be any type of network, like the network 131 described above, and may use one or more communication protocols (e.g., protocols for the Internet (IP), Bluetooth, cellular communications, satellite communications, and the like) to connect computing devices, remote autonomous vehicles, and servers within the network environment 200 so they may send and receive communications between each other. In particular, the network 202 may include a cellular network and its components, such as cell towers. Accordingly, for example, a mobile device 210 (e.g., a smartphone) or a computing device 208 of an individual associated with vehicle 212 may communicate, via a cellular backhaul of the network 202, with an insurance server 206 to send insurance data for one or more individuals associated with the vehicle 212. In another example, the mobile device 210 of the individual associated with vehicle 212 may communicate, via a cellular backhaul of the network 202, with the insurance server 206 to report a roadside incident, report damage, or file a claims request for the vehicle 212. And, in the opposite direction, the insurance server may communicate, via the cellular backhaul of the network 202, with the mobile device 210 to notify the user (e.g., the individual associated with vehicle 212) of the mobile device 210 with notifications or with information to be displayed in an insurance mobile application of the mobile device 210. In another embodiment, the mobile device 210 may communicate back and forth with the insurance server 206 over the Internet, such as through a web portal. As shown in FIG. 2, it should be understood that the mobile device 210 may connect to the network 202 even if it is removed from the vehicle 212.

The vehicle 212 may be, for example, the vehicle of a driver, individual, or customer of an insurance company or vehicle covered by an insurance policy of an insurance company. In an embodiment, there may be multiple vehicles 212 that are covered by an insurance policy of one individual. Although FIG. 2 illustrates only one vehicle 212, the insurance server 206 may be configured to communicate with multiple vehicles 212 simultaneously (e.g., at or around the same time), wherein multiple vehicles 212 may be associated with multiple individuals. Also, although FIG. 2 depicts the vehicle 212 as a car, the vehicle 212 may be any type of vehicle, including a motorcycle, bicycle, scooter, snowmobile, UAV (or other automated device), truck, bus, train, commercial vehicles, tractor, moped, off-road vehicle, caravan, recreational vehicle, boat, ship, other marine vehicles, plane, helicopter, tank, airplane carrier, battleship, other military vehicles, and the like.

An individual associated with the vehicle 212 may also be associated with and operate the mobile device 210. In an embodiment, the mobile device 210 may be a specialized mobile device, a tablet, laptop, personal computer, and the like configured to perform or carry out aspects associated with requesting roadside assistance and/or reporting an insurance claim. The mobile device 210 may belong to a driver, individual, or customer of an insurance company who submits an insurance claim for the vehicle 212. Additionally, or alternatively, the mobile device 210 may be used to report the location of the vehicle 212. The insurance server 206 may identify the location of the mobile device 210 by tracking the position of the mobile device 210. Additionally or alternatively, the insurance server 206 may identify the location of the vehicle 212 by receiving position information from the vehicle 212. For example, the vehicle 212 may include an electronic device (usually comprising a GSM GPRS modem or SMS sender) installed in each vehicle, communicating with the user (dispatching, emergency or coordinating unit) and PC- or web-based software.

In an embodiment, an insurance mobile application may be downloaded or otherwise installed onto the mobile device 210 using known methods. Different devices may install different versions of the insurance mobile application depending on their platform. For example, a mobile device 210 (e.g., a smartphone) running the iOS™ operating system may download a different version of the insurance mobile application than a mobile device 210 running the ANDROID™ operating system.

The insurance server 206 may generate a user interface (e.g., a graphical user interface for a website, application, software program, and the like) for display on a display screen of a computing device 210. The display 210 may comprise a monitor, television, touchscreen, and the like. The user interface of the insurance mobile application may allow individuals to send driver information, receive notifications of policy changes, receive notifications to perform tasks from the insurance company, submit service requests, and send and receive status updates to their insurance policy. The insurance mobile application may be a self-sufficient program or may be a module of another program. The insurance mobile application may have access to driving data that is collected by the sensors of the mobile device 210. The sensors may comprise various sensors and/or modules that detect driving behaviors, environmental information, and/or other risk-related factors of a driver of a vehicle 212. For example, the sensors may comprise an accelerometer, GPS, gyroscope, and the like. In an embodiment, the sensors may detect risk-related factors that may result in a roadside incident involving the vehicle 212.

An individual may launch the insurance mobile application on their mobile device 210 by, for example, operating buttons or a touchscreen on the mobile device 210. Additionally, or alternatively, the mobile device 210 may be configured to execute a web browser (e.g., an application for accessing and navigating the Internet) to access a web page providing an interface for the insurance mobile application. In some embodiments, the mobile device 210 may also be configured to collect information, such as driving data. For example, the insurance mobile application or another program installed on the mobile device 210 may instruct the mobile device 210 to collect driving data using the sensors (e.g., its accelerometer, GPS, gyroscope, and the like). Driving data may include vehicle telematics data or any other data related to events occurring during a vehicle's trip (e.g., an impact to a part of the vehicle, a deployed airbag, and the like). Driving data may also include location information, such as GPS coordinates, indicating the geographical location of the mobile device 210 and/or vehicle 212.

An individual associated with the vehicle 212 and associated with the mobile device 210 may employ the insurance mobile application to send driver information, receive notifications of policy changes, receive notifications to perform tasks from the insurance company, submit service requests, and send and receive status updates to their insurance policy, send and/or access at least one of roadside assistance requests, incident details, messages, account information, and settings/preferences related to the vehicle 212. In order to employ the insurance mobile application, an individual associated with the vehicle 212 might not need to be a driver of the vehicle 212. In an embodiment, a parent may be associated with the vehicle 212, but might not actually drive the vehicle 212. For example, the vehicle 212 may have been purchased by a teenager (or parent) and may only be driven by the teenager, but the vehicle 212 may be insured on the parent's insurance policy. Thus, the parent may be able to send driver information, report a roadside incident, and/or request roadside assistance for the vehicle 212 through the insurance mobile application even though the teenager is the one driving the vehicle 212. Additionally or alternatively, the teenager may be able to send driver information, report a roadside incident, and/or request roadside assistance for the vehicle 212 through the insurance mobile application even though the parent is the one driving the vehicle 212. Ultimately, any of the one or more individuals associated with the vehicle 212 may use the insurance mobile application through a respective mobile device 210 to file an insurance claim, request roadside assistance, communicate with insurance agent(s), and/or with insurance provider(s).

Additionally, FIG. 2 also illustrates a telematics device 214 connected to the network 202. In an embodiment, the telematics device 214 may be referred to as a vehicle computing device that is associated with the vehicle 212 and the mobile device 210. In some embodiments, the mobile device 210 and telematics device 214 may communicate with one another (e.g., via Bluetooth). The mobile device 210 may be any mobile device (e.g., a smartphone, tablet, and the like) that is associated with an individual or passenger of the vehicle 212. In particular, the mobile device 210 may belong to an individual associated with the vehicle 212, wherein the individual is a customer of an insurance company and enrolled in a service that allows the individual to participate in roadside assistance services. The mobile device 210 may be configured similarly to the roadside assistance device 212 and may interface with the telematics device 214.

In some embodiments, the telematics device 214 may be a device that is plugged into the vehicle's 212 on-board diagnostic (OBD) system (e.g., plugged in through an OBD II connector) or otherwise installed in the vehicle 212 in order to collect driving data using, e.g., its accelerometer, GPS, gyroscope, or any other sensor (either in the telematics device 214 or the vehicle 212). As mentioned above, this driving data may include vehicle telematics data or any other data related to events occurring during a vehicle's trip (e.g., an impact to a part of the vehicle 212, a deployed airbag, or other event triggered by a sensor of the vehicle 212). The vehicle 212 may have a GPS installed therein, and therefore, the telematics device 214 may also collect GPS coordinates.

Further, the telematics device 214 may include multiple devices. For example, the telematics device 214 may include the vehicle's OBD system and other computers of the vehicle 212. The telematics device 214 may be configured to interface with one or more vehicle sensors (e.g., fuel gauge, tire pressure sensors, engine temperature sensors, and the like). The telematics device 214 may also interface with the mobile device 210 via a wired connection (e.g., USB, OBD II connector, and the like) or a wireless connection (e.g., Bluetooth). In some embodiments, there might not be a telematics device 214 installed in the vehicle 212 that is configurable to interface with insurance mobile application executing on mobile device 210, or the telematics device 218 might not be able to communicate with the mobile device 210. Still, in some cases, the telematics device 218 might be configured so that it only communicates with the mobile device 210 within the same vehicle 212.

In an embodiment, both a telematics device 214 and a mobile device 210 (or a roadside assistance device 212) may be employed, whereas in another embodiment, only one of these devices may be used with the roadside assistance system to collect driving data. For example, an individual associated with the vehicle 212 may choose whether he or she wishes to use his or her mobile phone to capture driving data or whether he or she wishes to have a device plugged into the vehicle 212 to collect driving data.

In an embodiment, an individual associated with the vehicle 212 and the mobile device 210 may be able to file an insurance claim at the mobile device 210 by accessing the insurance mobile application. By gathering data inputted from the mobile application and the telematics device 214, the insurance server 206 may have access to driver information, insurance account information, billing information, and location information of the user of the mobile application associated with the vehicle 212.

The central server 206 may dispatch an UAV 204 to the location of the vehicle 212 upon determining that the vehicle 204 needs to be inspected. For example, the insurance server 206 might receive information from the on-board telematics device 214 that the vehicle 212 has been in an automobile accident and needs support. The insurance server 206 may receive the location of the vehicle 212 and/or the driver of the vehicle 212 from the telematics device 214 or the mobile device 210. The insurance server 206 may dispatch the nearest UAV 204 to the location of the vehicle 212 and/or the driver of the vehicle 212. The UAV 204 or the insurance server 206 may calculate a trajectory for the UAV 204 to the location of the vehicle 212 and/or the driver of the vehicle 212 by detecting the current location of the UAV 204 and creating a flight trajectory avoiding any restricted airspace and/or any obstacles (e.g., tall skyscrapers, trajectories of other aircraft, storms and/or turbulent conditions).

In some embodiments, the insurance server 206 may instruct the UAV 204 to travel to the location of the vehicle 212 upon receiving an insurance claim from an insurance policyholder associated with the vehicle 212. For example, an insurance policyholder may submit an insurance claim for damage incurred to vehicle 212 from computing device 208 or from mobile device 210. Such an insurance claim may be transmitted to insurance server 206. Upon receiving and processing such an insurance claim, the insurance server 206 may identify the vehicle 212 associated with the insurance claim from the insurance claim. The insurance server 206 may determine whether the policyholder can provide evidence of the damage to the vehicle 212. For example, the insurance server 206 may send a notification to the user through the mobile insurance application, text message, email, or a phone call to the mobile device 210 to submit photographs and/or video of the damage to the vehicle 212. If the user indicates that he is unable to submit such evidence of damage or if evidence submitted by the user does not meet the insurance company's standards, the insurance server 206 may instruct the UAV 204 to collect information on damage to the vehicle 212.

In some embodiments, the insurance server 206 may contact authorities if it detects that the insurance policyholder is in an emergency situation. For example, the UAV 204 may communicate with insurance server 206 to determine whether a driver of vehicle 212 or a resident of an insured property has been injured and/or is involved in an emergency incident. Such a determination may be made by analyzing the information collected by the UAV 204 (e.g., video, audio, chemical sensor data, heat sensor data) to determine whether a user is in distress. If the insurance server 206 determines that the user is an emergency, the insurance server 206 may contact first responders (e.g., local police, fire department, an ambulance) to provide aid to the injured policyholder and/or person identified.

The insurance server 206 may calculate a payment amount to provide the insurance policyholder based on the assessed damage inspected by the UAV 204. For example, the insurance server 206 may identify the policyholder and insurance account that is associated with the vehicle 212. The insurance server 206 may identify the type of policy coverage that vehicle 212 is associated with by examining the user's account. The insurance server 206 may receive damage information from UAV 204 detailing the types of damage and overall condition of the vehicle 204. The insurance server 206 may use such information received from the UAV 204 to identify the damages sustained by the vehicle 212 and may identify whether each of the identified damages is covered by the insurance policy of the associated insurance account. For each of the identified damages reported by the UAV 204, the insurance server 206 may determine whether a payment is to be made for that damage by examining the user's past account activity with regards to vehicle 212. For example, the insurance server 206 may identify if the policyholder has been notified that he had previously incurred three similar damages within a year and that another damage would not be covered by his insurance policy. If such a determination or a similar determination is made, the insurance server 206 may determine that the policyholder is not eligible for the full amount or a partial amount of insurance payout for that damage. The insurance server 206 may determine whether to issue a payment for each identified damage reported by the UAV 204 based on the user's past account activity and the collected damage information. By accumulating the list of damages, the insurance server 206 may determine a total amount of payment to provide the insurance policyholder in real-time as the UAV 204 is collecting such information. The insurance server 206 may instruct the UAV 204 to provide the user with a debit card or a check for the calculated amount once the UAV 204 has finished collecting damage information and the server 206 has calculated a final amount of insurance payment based on the collected damage information. For example, the insurance server UAV 204 may print a check for the determined amount or dispense a debit card for the determined amount at the location of the insured property if the UAV 204 determines that the policyholder is present at that location at that time.

In some embodiments, the insurance server 206 may instruct the UAV 204 to focus its damage collection on specific features of the insured property. For example, the insurance server 206 may examine the insurance policyholder's account information and determine from the past account history of the user whether there is a particular feature of vehicle 212 that poses an insurance risk. As an example, an insurance agent may have previously reported that the tail light of vehicle 212 had not been functioning and that that wheel bearing of a tire had been damaged at the time of the last inspection of vehicle 212. Accordingly, the insurance server 206 may instruct the UAV 204 to carefully inspect the tail light and wheel bearings of vehicle 212 to determine the condition of these aspects. The insurance server 206 may determine that poor maintenance of wheel bearings causes axle failure. Accordingly, the insurance server 206 may instruct the UAV 204 to inspect the axles of the vehicle 212 to detect any damage. Such aspects of the vehicle 212 may be insurance risks that the insurance server 206 has determined based on the account history of the vehicle 212. By examining the past history of the vehicle 212, the insurance server 206 may instruct the UAV 204 to pay attention to these features and use its onboard sensors to run one or more tests on these features. When the insurance server 206 receives damage information on the vehicle 212 from the UAV 204, it may examine the damage information associated with such identified insurance risks to determine whether to adjust the insurance payment. For example, if the insurance server detects that the axle of the vehicle 212 has broken and that there is extreme damage to the wheel bearings of the car due to low maintenance, the insurance server 206 may determine to pay a minimum amount of money or not provide the user for any payment for such axle damage. The insurance server 206 may make such a determination upon determining that the user had been notified one or more times to repair his poorly maintained wheel bearings and that such poor maintenance of vehicle 212 is not in compliance with the insurance policyholder's insurance policy.

Although the example embodiment described in FIG. 2 has been described within the context of a vehicle being the insured property, the same principles described above with relation to FIG. 2 may extend to other types of insured property including real estate property. For example, the insurance server 206 may dispatch UAV 204 to inspect the condition of a real estate property according to the techniques described above with relation to vehicle 212.

Figure 3:
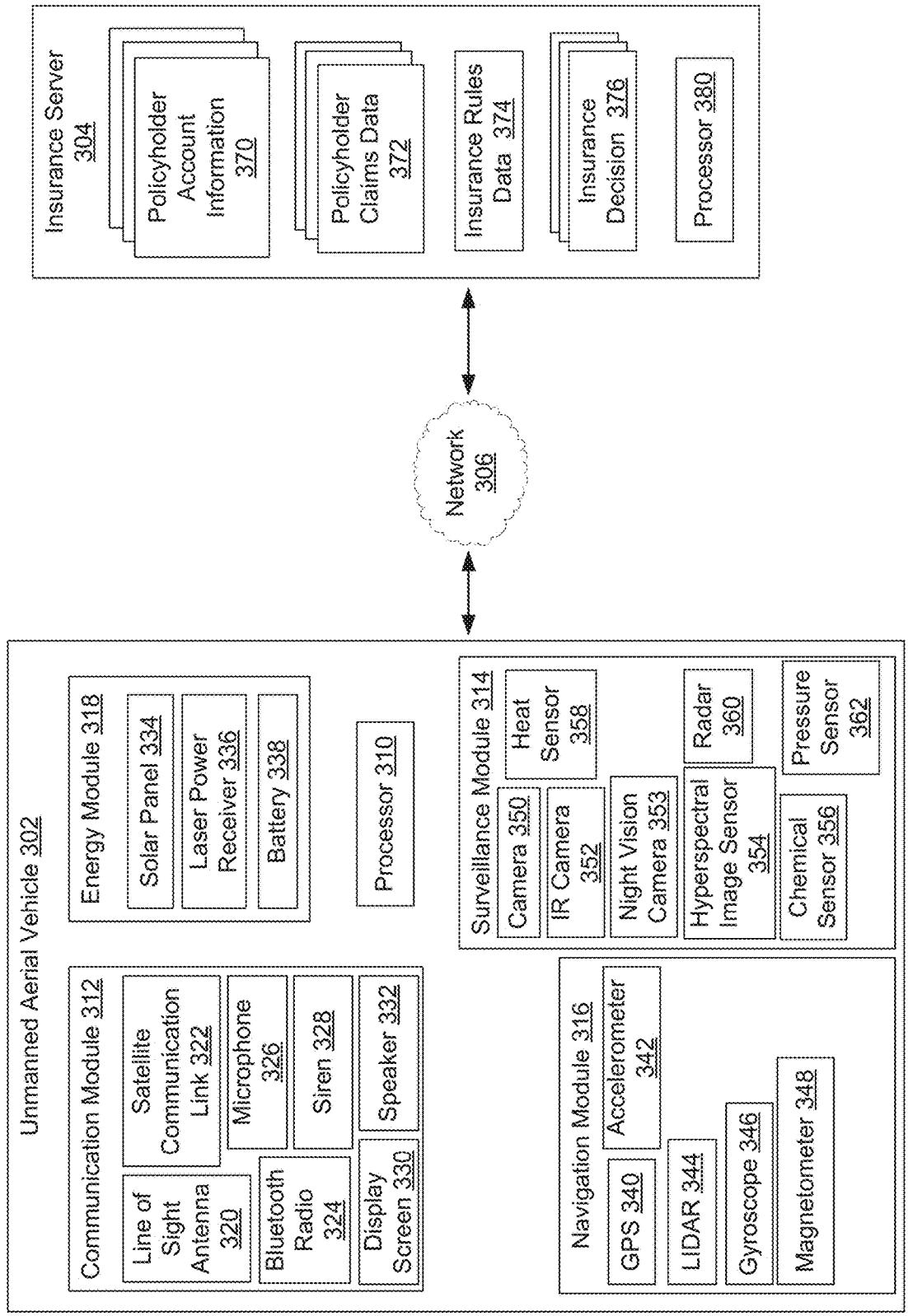
FIG. 3 illustrates a block diagram of a UAV and an insurance server that communicate with each other to implement aspects of the disclosure.

FIG. 3 illustrates a block diagram 300 of a UAV 302 and an insurance server 304 that may communicate with each other to implement various aspects of the disclosure. UAV 302 and insurance server 304 may correspond to UAV 204 and insurance server 206 of FIG. 2, respectively. The UAV 302 may include a processor 310, a communication module 312, an energy module 318, a navigation module 316, and a surveillance module 314. Each of these modules may comprise several different hardware components and computer readable instructions that govern the operation of each of these hardware components with one another and the processor 310. The processor 310 may receive instructions from insurance server 304 to collect a specific type of data and/or perform a specific operation. Accordingly, the processor 310 may determine which hardware component and/or one or more of its onboard sensors it needs to use to perform the requested operation from the insurance server 304. As described herein, any actions that the UAV 302 undertakes may be performed as a result of the processor 310 making a determination to perform such an action based on communications with insurance server 304, data collected from the insured property, and/or programming governing operational tasks such as information gathering, navigation, communication, power management etc.

Communication module 312 of UAV 302 may include various different hardware components that allow the UAV 302 to communicate with insurance server 304 and other computing devices over network 306 and with people in its vicinity. For example, the communications module 312 may include a line of sight antenna 320, a satellite communications link 322, a Bluetooth radio 324, a microphone, 326, a siren 328, a display screen 330, and a speaker 332.

The UAV 302 may include a line of sight antenna 320 to communicate with a remote pilot that may control and/or drive the UAV 302 within a line of sight of a ground control station. A pilot remotely located at a ground control station may control the takeoff and landing of the UAV 204 within line of sight of the ground control station. Once the UAV 302 is out of line of sight of the ground control station, the UAV 302 may communicate with the ground control station and/or the remote pilot through a satellite communication link 322 via a communications satellite. The UAV 302 may also be able to communicate with a GPS satellite using the satellite communication link 322 to monitor its own location and guide itself according to a calculated trajectory. The UAV 302 may communicate with other nearby devices such as a vehicle's black box using Bluetooth radio 324 or a user's smartphone once it is in range of the vehicle and/or user's smartphone. The UAV 302 may display messages to people within its vicinity using display screen 330. For example, the UAV 302 may facilitate a videoconference with a remotely located insurance agent and the insurance policyholder. The UAV 302 may conduct such a conference by using microphone 326 to record the policyholder's voice, use speakers 332 to output the insurance agent's voice, use camera 350 to record the policyholder's video and display the insurance agent to the policyholder on the display screen 330. The UAV 302 may also alert other people in its vicinity of its arrival by using sirens 328.

The UAV 302 may be able to power itself using energy module 318. The energy module may include one or more of a battery 338, a solar panel 334, and a laser power receiver 336 amongst other sources of renewable and nonrenewable energy to power the UAV 302. The UAV 302 may be autonomously controlled and may constantly (or at regular or irregular time intervals) perform monitoring operations one after the other without landing. The UAV 302 may be able to charge its battery 338 using solar panels 334 when there is available sunlight or may be able to receive power from base stations' transmitted laser beams using laser power receiver 336.

The UAV 302 may be able to navigate itself using GPS tracking system 340. GPS tracking system 340 may communicate with GPS satellites satellite communication link 322 to obtain the position of the UAV 302. The GPS tracking system 340 may plot the trajectory of the UAV 302 from its current location to an instructed destination. GPS tracking system 340 may be able to plot the trajectory based on known flight paths avoiding restricted no fly areas and avoiding obstructions. The UAV 302 may be able to detect its current speed using accelerometer 342 and its heading using magnetometer 348. Such information may be used by the GPS tracking system 340 to help adjust the course of the UAV 302. The UAV 302 may be able to scan the upcoming airspace for obstructions using LIDAR 344 for collision avoidance. The UAV 302 may be able to correct its orientation using gyroscope 346. For example, if the UAV 302 detects from gyroscope 346 that it is not flying straight because it is not oriented perfectly parallel to the surface, then the processor 310 may instruct one or more motors to correct the angle at which the UAV 302 is flying.

The UAV 302 may be able to collect information on insured property using surveillance module 314. The surveillance module 314 may include camera 350, IR camera, 352, hyperspectral image sensor 354, chemical sensor 356, heat sensor 358, radar 360, and pressure sensor 360 amongst other sensors not shown in FIG. 3. Each of these sensors may be controlled by a remote operator to zoom in and zoom out on a particular target. For example, a remote operator may be able to control the camera 352 to capture a still images and/or a live video feed of the insured property once the UAV 302 reaches the insured property. The remote operator may manipulate where the camera 352 is focused on and zoom in and zoom out, pan right, left, up, or down to capture detailed images of the insured property. The UAV 302 may be able to autonomously capture images using camera 352 and other data measurements of the insured property using the other sensors of the surveillance module 314.

The UAV 302 may capture thermal images using infrared (IR) camera 352. For example, when performing scene investigation of a vehicle, the UAV 302 may employ IR camera 352 to capture thermal images of the engine, the exhaust pipes, and other parts of the automobile to detect for abnormal thermal signatures in the vehicle. When collecting data, the UAV 302 may sense if there are people inside a damaged car or damaged real estate by taking thermal images of the insured property. For example, if the UAV 302 detects that there is a life threatening emergency in the house or vehicle that it is monitoring using its onboard sensors, the UAV 302 may detect whether there are people inside the vehicle or house by using thermal images. Thermal images can capture heat signatures inside a house or vehicle which can be resolved by the process 310 of UAV 302 to detect that a person is currently inside the house or vehicle. The UAV 302 may then issue a warning using communication module 312 to the person to evacuate the house or vehicle due to the emergency condition. The UAV 302 may also contact first responders to be dispatched to the location of the house or vehicle with the emergency condition once it detects that there are people stuck inside. In non-life threatening situations, the UAV 302 may detect whether there are people inside the insured real estate and/or vehicle 302 to determine whether to deliver the calculated insurance payment. For example, if the UAV 302 determines using IR camera 352 that there is a person inside the house that it is currently inspecting, the UAV 302 may deliver the insurance payout determined by the insurance server 304 upon receiving all inspection information from the UAV 302. Similarly, the UAV 302 may deliver a prepaid debit card and/or check for the payout amount to the driver of the insured vehicle upon determining that the driver is within or near the vehicle. Thermal images from IR camera 352 may also be used to collect information about a real estate property. For example, the UAV 302 may be able to obtain a thermal image map inside the real estate property that it is inspecting to detect whether the heating system of the house is functioning properly.

The UAV 302 may capture images in a low light setting using night vision camera 352. For example, when the UAV 302 flies over a real estate property at night in response to an emergency request from the insurance policyholder, the UAV 302 may employ night vision camera 352 to capture images of the property. Similarly, if the UAV 302 is dispatched during night time to an automobile accident scene to perform scene investigation and/or collect detailed images on what has occurred, the UAV 302 may recognize that there is low ambient light (e.g., determine from images captured by camera 352 that there is low ambient light) and use night vision camera 352 to collect images in the dark.

The UAV 302 may also use hyperspectral image sensor 354 to assess the condition of the different parts of an insured vehicle or real estate property. Hyperspectral imaging allows collection of data on the material composition of objects in the field of view. The UAV 302 may use hyperspectral image sensor 354 to detect whether there is any coolant left in the vehicle, the condition and composition of the battery fluid, and whether any of the engine has been burnt (e.g., by detecting presence of burnt compounds in the engine), amongst other things. Similarly, the UAV 302 may also analyze the material composition of elements in or near an insured real estate property to detect damage, rust, and decay to parts of the real estate property. Such material composition data gathered by the UAV 302 may be useful in evaluating the condition of the insured property.

The UAV 302 may use chemical sensor 356 to assess the condition of the different parts of an insured vehicle or real estate property. For example, when a UAV 302 arrives at the scene of an automobile accident, the UAV 302 may use chemical sensor 356 to detect the composition of gases in the surrounding near the insured vehicle to determine if there is a gas leak or whether there are toxic gases being released from the vehicle. Upon detecting the presence of such gases, the UAV 302 may trigger an emergency condition alert and may inform people nearby to evacuate the area, and may alert first responders if there are any people stuck in the automobile that have not left the automobile immediately after the warning. The UAV 302 may also collect samples from various parts of the insured vehicle and/or real estate property that it is investigating and may run chemical tests on them using the chemical sensor 356 to assess the chemical composition of these compounds. For example, when inspecting a real estate property, the UAV 302 may collect samples from parts of the real estate property and analyze them using chemical sensor 356 to detect whether there is mold or mildew. The UAV 302 may also detect, using chemical sensor 356, whether the real estate property is leaking Freon from air conditioners, whether there is a high level of carbon monoxide or other toxic gases in the real estate property.

The UAV 302 may use heat sensor 358 to detect the temperature of different parts of an insured vehicle or real estate property. For example, the heat sensor 358 may measure the temperature of an overheating engine or exhaust vent or any other component of the vehicle to detect whether any component of an insured vehicle is overheating beyond its normally expected temperature range. The UAV 302 may use such temperature measurements to detect whether there is an issue with any parts of the vehicle and may perform additional analysis such as capturing thermal images, video images, and hyperspectral image data to detect whether there is a problem with the overheating part of the vehicle. The UAV 302 may also use heat sensor 358 in a similar manner to detect whether there are any overheating components in the real estate property.

The UAV 302 may detect the speed of vehicles using radar 360. For example, the UAV 302 may be flying over an insured vehicle and may measure the speed at which the insured vehicle is travelling using radar 360. If the UAV 302 is near an insured vehicle when it is involved in a vehicular accident, the UAV 302 may be able to report whether the vehicle was over-speeding using the measured speed of the vehicle prior to the accident from the radar 360. The UAV 302 may also use radar 360 to detect if there are any nearby UAVs in the area already present and may instruct such UAVs to assist it to collect data on the insured vehicle and/or real estate property. For example, UAVs that are flying by UAV 302 may be detected by the UAV 302 using radar 360. UAV 302 may request such passing UAVs to work with it to monitor a segment of a road or traffic intersection such that UAV 302 monitors a portion of the road while the other UAV monitors another portion of the road in coordination with UAV 302.

The UAV 302 may also use a pressure sensor 362 (e.g., barometer) to aid in insurance data collection of an insured vehicle and/or real estate property. When inspecting a real estate property such as a multi-story building or a skyscraper, the UAV 302 may measure its altitude using pressure 362. The pressure sensor 362 may be finely tuned and sensitive enough to detect differences in altitude from one floor of a building to another. For example, the UAV 302 may be instructed by insurance server 304 that an office on the $35^{th}$ floor of a skyscraper is the insured property for which to collect data. The UAV 302 may adjust its own altitude using data from pressure sensor 362 to ensure that the data it is collecting for the skyscraper corresponds to data measured for the $35^{th}$ floor and not other floors. The UAV 302 may also measure wind conditions near a vehicle using pressure sensor 362. For example, the UAV 302 may detect that the area at which the vehicle has crashed is extremely windy and may record such a measurement to determine whether a storm may have partly caused the vehicle to lose control and result in a vehicle accident.

The UAV 302 may communicate with one or more insurance servers such as server 304 over network 306. The network 306 may be a series of satellites that provide an Internet connection between UAV 302 and the insurance server 304 over the Internet. The UAV 302 may also communicate with a nearby cellphone tower and transmit its messages to the cellphone tower for eventual transmission to the insurance server 304 and/or other computing devices. The UAV 302 may communicate with the cellphone tower through an onboard antenna such as antenna 320. Additionally or alternatively, the UAV 302 may communicate with a nearby computing device over a Bluetooth network. The Bluetooth enabled computing device may relay the UAV 302's messages to the insurance server 304 through the Internet or another network 306.

In some embodiments, the insurance server 304 may comprise a processor 380 that is able to process information received from UAV 302 and perform insurance claims calculation. As described herein, any actions that the insurance server 304 undertakes may be performed as a result of the processor 380 making a determination to perform such an action based on at least one of insurance rules data 372, policyholder account information 370, and communications with UAV 302. The insurance server 304 may include one or more computing devices stored near or remotely from one another and may collectively include policyholder account information 370, policyholder claims data 372, insurance rules data 374, and insurance decisions 376. The insurance server 304 may include policyholder account information 370 on each policyholder comprising user profile data including residence information, age, and other demographic information. The policyholder information 370 may also comprise the payment history of the insurance premiums, the insurance policies that the policyholder has active, past events (e.g., purchase, accidents, maintenance repairs, driving record, property estimates, etc.) associated with the insured vehicle and/or real estate property of the policyholder.

In some embodiments, the insurance server 304 may also include, for each of its policyholders, policyholder claims data 372. Policyholder claims data 372 may include past claims that the policyholder may have filed for the insured property in question now or other insured properties. The policyholder claims data 372 may also include the claims request for the current claim being filed. The claim request may specify the location of the insured property. The claim information may also include details on condition of the insured property. The insurance server processor 380 may determine by examining the policyholder claims data 372 whether additional information on the condition of the insured property is required besides what is already received. In response to such a determination, the insurance server 304 may instruct the UAV 302 to travel to the location of the insured property.

In some embodiments, the insurance server 304 may include insurance rules data 374 that govern how an insurance decision such as insurance decision 376 on how much insurance payout to provide the policyholder in response to a claims request. The insurance rules data 374 may include insurance claim calculation rules that determine how to calculate an insurance payout amount using received information about damage and/or condition of the insured property. For example, the insurance rules data 374 may include rules on how much money to disburse to an insured policyholder for damage to his automobile if his policyholder account information 370 and/or claims data 372 indicate that he has had a set number of accidents or reported damages for that insured property within a given period of time. The insurance server 304 may receive damage information and/or a condition report from the UAV 304 on the insured property that it is investigating. Once such information has been received, the processor 380 may determine the nature and extent of damage to the insured property from the sensor measurements of the UAV 302. The processor 380 may consult policyholder account information 370 and policyholder claims data 372 examine the past account history and claims data of the insured policyholder with respect to the insured property and/or other insured properties. The processor 380 may determine how much insurance payout to disburse to the insurance policyholder based on the identified damage to the insured properties by processing all the account information, claims data, and damage information using insurance rules data 374. Once such a determination on the amount of insurance payout to disburse to the insurance policyholder is made, the insurance server 304 may instruct the UAV 302 to provide the insurance policyholder with a debit card or check for that amount. Alternatively, the insurance server 304 may instruct an account departing of the insurance provider to mail a check and/or debit card in the amount of the determined payout amount to the policyholder's residence or electronically credit the policyholder though electronic wire transfer and/or direct deposit into the policyholder's bank.

Figure 4:
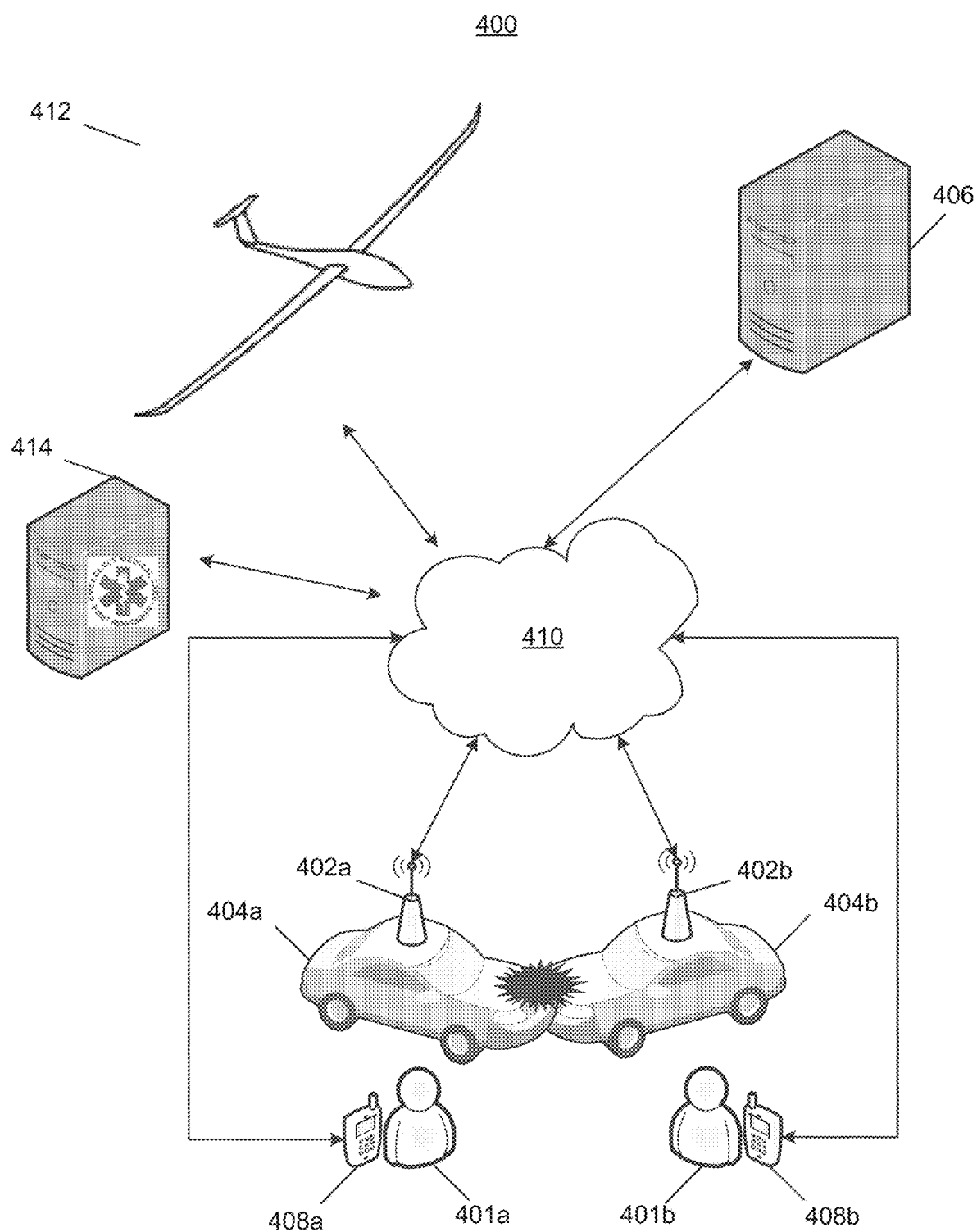
FIG. 4 illustrates an example environment in which information may be collected by a UAV on an insured property according to one or more aspects described herein.

FIG. 4 illustrates an example environment 400 in which information may be collected by a UAV 412 on an insured property. The example embodiment illustrated in FIG. 4 shows that two individuals 401a and 401b may have been involved in a vehicle collision, e.g., an accident involving their respective vehicle 404a and 404b. Wireless communication devices 402a and 402b at each vehicle 404a and 404b, respectively, may wirelessly communicate with automated collision detection, fault attribution, and claims processing system 406. The automated collision detection, fault attribution, and claims processing system 406 may be additionally or alternatively referred to as an insurance server 406, which may correspond to insurance server 206 of FIG. 2 and insurance server 304 of FIG. 3. Communications may be exchanged between the insurance server 406 and a mobile device 408a and/or 408b operated by the individual 100a and/or 100b, respectively, via, for example, a network 410. Such communications may alert the insurance server 406 of the nature of the accident and whether UAV 412 should be dispatched to the location of the accident. The UAV 412 may correspond to UAV 204 of FIG. 2 and UAV 302 of FIG. 3.

An individual 401a and/or 401b whose vehicle 404a and/or 404b was involved in a collision may or may not be a customer of an insurance provider that provides insurance coverage. In some instances, participants may be customers of the same insurance provider while in other instances the participants may be customers of different insurance providers. The insurance provider may provide and operate the insurance management system 406 to automatically detect collisions, to dispatch UAV 412 to collect data on the accident, to automatically determine and attribute fault, and to automatically process insurance claims resulting from the vehicle collision.

Each participant in the vehicle collision may be insured by the insurance provider that operates the insurance server 406. In some situations, the participants may be respectively insured by different insurance providers in which case one of the participants may be described as being insured by a third-party insurance provider, e.g., a third-party insurer. The third-party insurer may operate a third-party insurance management system that also automatically detects collisions, determines and attributes fault, and processes insurance claims.

As a result of a vehicle collision, respective insurance claims may be filed by one or more of the participants. Accordingly, a claimant may be a participant for which an insurance claim has been filed. The claimant may be insured by the insurance provider or the third-party insurance provider. In other words, the claimant may or may not be a customer of the insurer that operates the insurance management system. In addition, the claimant may or may not be the at-fault participant, e.g., the individual to whom fault for the collision is attributed and liability assigned.

Moreover, a collision is but one type of physical disturbance event that may occur involving a vehicle. Stated more broadly, aspects of the disclosure are directed towards determining when a physical disturbance event or incident occurs at a vehicle. A physical disturbance may be, for example, two moving vehicles impacting one another, one moving vehicle impacting a stationary object (e.g., a non-moving vehicle, a parked vehicle, a wall, etc.), a towing of the vehicle, a break-in or burglary at the vehicle, and other events that physical disturb the vehicle. While aspects of the disclosures set forth below are described in the context of vehicle collisions, it will be appreciated that the disclosures are also applicable to other physical disturbance events involving the vehicle.

The insurance server 406 provides a number of advantages by automating aspects of responding to collisions. As an example, the insurance server 406 advantageously reduces the cost, time, and effort involved in processing and resolving an insurance claim by automating aspects of the claim processing and resolution process. The insurance server 406 may automatically collect information relating to the collision, automatically determine and attribute fault to one of the participants, automatically estimate the cost to repair a damaged vehicle, and automatically provide settlement offers to participants involved in vehicle collisions. Moreover, by automating aspects of responding to vehicle collisions, the insurance server 406 may advantageously provide automated settlement offers within a relatively short timeframe after the collision occurred. The insurance server 406 also advantageously reduces the cost, time, and effort associated with subrogation by automating aspects of the subrogation process.

In some embodiments, insurance server 406 may determine which, if any, individual is at fault for the accident. The insurance server 406 may make such a determination by collecting information about the accident from the UAV 412. The UAV 412, may for example, be instructed by the insurance server 406 to travel to the location of the accident. The insurance server 406 may detect the location of the accident by monitoring the location of vehicle 404a and/or vehicle 404b through their respective wireless communication devices 402a and 402b. Additionally or alternatively, the insurance server 406 may detect the location of the accident by monitoring the location of vehicle 404a and/or vehicle 404b through mobile device 408a and/or 408b of the respective individuals 401a and 401b involved in the accident.

In some embodiments, the insurance server 406 may determine which individual, if any, was, either fully or partially, at fault for the accident by contacting individuals 401a and 401b and collecting their testimonies. The insurance server may process the recorded testimonies through a natural language speech detection and processing algorithms to determine whether there is any conflicting opinion from the testimonies of both individuals 401a and 401b for who is at fault. Similarly, other witnesses may also be able to contact the insurance company through network 410 by calling a hotline using their mobile phones and provide testimonies that will be considered in fault determination. If it is determined that there is at least a preset minimum number of testimonies for an accident and that a preset percentage of testimonies attribute fault to one individual, the insurance server 406 may contact that individual and collect his testimony, if not already provided. If the individual admits fault, then the insurance server 406 may attribute fault to that individual and take such fault determination into consideration when calculating an insurance payout. In other embodiments, the insurance organization that operating the insurance server 406 may contact police agencies and retrieve police records to identify who was at fault for the accident.

In some embodiments, the UAV 412 may be used as an insurance adjuster. For example, the insurance server 406 may instruct the UAV 412 to inspect an insured property item (e.g., vehicle 402a and/or vehicle 404a) in response to determining that the insured property may have been damaged. For example, once the insurance server 406 receives a notification that the vehicle 402a is damaged, the insurance server 406 may determine that UAV 412 is nearby and that the UAV 412 is able to collect damage information and/or claims data for vehicle 402a in a timely manner. In conventional insurance organizations, in response to determining that an insured property such as vehicle 402a may be damaged and/or that it is required to monitor the condition of vehicle 402a in order to compute a business decision related to vehicle 402a's condition, the insurance organization may deploy a human claims adjuster to collect information on the insured property. In conventional insurance organizations, the human claims adjuster may use his best judgement and/or capabilities to collect as much data as possible on the insured property. However, according to embodiments described in the present disclosure, the insurance server 406 may instruct the UAV 412 to perform duties of the insurance claims adjuster and also perform additional duties to improve the insurance information collection processes.

In some embodiments, the UAV 412 may arrive at the scene of the accident moments after the accident and perform scene investigation at the location of the accident. The UAV 412 may be instructed by the insurance server 406 to look for certain clues at the location of the accident and/or from the vehicles involved in the accident. The UAV 412 may transmit the information that it has collected using its onboard sensors to insurance server 406 to help the insurance server 406 identify the cause of the accident and determine the party at fault. Additional description of fault determination performed with the aid of the UAV 412 is described below with relation to FIG. 6.

In some embodiments, UAVs such as UAV 412 may monitor a stretch of road and automobiles passing through it to detect erratic driving behavior. For example, a UAV 412 may detect that an automobile passing through an area that the UAV monitors is swerving in an out of lanes excessively. The UAV 412 may communicate such information to the insurance server 406. The insurance server 406 may identify that the vehicle is insured by the company associated with the insurance server 406 and may instruct the UAV 412 to follow such a vehicle with erratic driving behavior and log such activity. The insurance server 406 may determine that the driver poses a risk to other drivers on the road and to themselves based on the driving activity monitored by the UAV 412. Upon making such a determination, the insurance server 406 may notify the driver to stop driving in such an erratic manner. The UAV 412 may be dispatched to provide such a notification. Additionally or alternatively, the insurance server 406 may provide such a notification to the driver by displaying a message on an in-vehicle dashboard or the driver's mobile device. UAV 412 may be dispatched to approach the vehicle and use its onboard sensors (e.g., camera, chemical sensor, etc.) to determine if the driver of the vehicle appears to be under the influence of alcohol or narcotics and transmit such information back to the insurance server 406. The insurance server 406 may determine whether to issue a warning to the driver, raise the driver's insurance premium based on such an event, or suspend the driver's insurance policy based on such information. Additionally or alternatively, the insurance server 406 may alert the authorities to help the driver and avoid any future accidents due to the driver's erratic driving behavior. For example, the insurance server 406 may transmit an alert message to one or more emergency response centers or emergency response center servers 414 over network 410 to dispatch one or more policemen, ambulances, and/or fire trucks to the location of the vehicle.

Once an accident has already occurred, a UAV 412 may be dispatched to assess the nature of the damage at the scene of the accident. The UAV 412 may arrive before any authorities do and may determine if the accident is serious enough to alert the authorities or whether the driver simply needs some assistance from a tow truck but is not injured or require help from the authorities. The UAV 412 and insurance server 406 may perform such a determination by having the UAV 412 capture information about the condition of the vehicle and by perform scene investigation at the location of the accident and transmitting such information back to insurance server 406 for processing.

In some embodiments, the insurance server 406 may determine the amount of insurance payout to disburse to an insured policyholder as described above in relation with FIG. 3. The insurance server 406 may receive damage information about the vehicle from the UAV 412 to identify each item of vehicle damage that is covered by the associated insurance policyholder's insurance policy for that vehicle. The insurance server 406 may perform such processing automatically or it may gather the information collected for each damaged vehicle from a UAV and provide it to a claims adjustment agent. The insurance server 406 may provide all relevant account history, policy coverage information, and accident damage information collected by the UAV 412 to the claims adjustment agent who may make the final determination for an insurance payout. Once the insurance payout has been calculated, the insurance server 406 may transmit a payment to the insured policyholder either through the mail or electronically credit the policyholder's bank. Additionally or alternatively, the insurance server 406 may instruct the UAV 412 to provide the driver of the insured vehicle with a check or debit card for the determined amount at the location of the vehicle.

Once the insurance server 406 receives damage information from UAV 412, the insurance server 406 may automatically determine which individual 401a or 401b is at fault for the accident, and manage subsequent insurance claims resulting from the accident. The insurance server 406 may also communicate with the individuals 401a and 401b via respective mobile devices 408a and 408b operated by the individuals. It will be appreciated that, in some instances, more than two individuals may be involved in an accident. It will also be appreciated that, in some instances, a single vehicle may be involved in an accident. For example, an individual may hit a pole or a wall or the individual may forget to set a parking brake causing the vehicle to run away on its own. Accordingly, aspects of this disclosure are also applicable in situations where a single vehicle is involved in an accident.

In some embodiments, the insurance server 406 may inform a UAV 412 en route to the location of the accident and/or the insured vehicle that the insured vehicle has moved away from the accident site or whether it is still at the accident site. For example, the vehicle may have moved away from the accident site to go to a police station, have been ordered to move by a police officer, or have been towed by a tow truck. The insurance server 406 may continuously monitor the location of the insured vehicle and may update the trajectory of the UAV 412 to match the current location of the insured vehicle.

In some embodiments, the UAV 412 should still be dispatched to the current location of the vehicle once the vehicle has moved away from the accident site or whether the UAV 412 that is dispatched should be recalled. The insurance server 406 may make such a determination based on the current location of the vehicle, who has taken control of the vehicle, and whether the vehicle is still available for inspection after it has moved. For example, the insurance server 406 may determine that the vehicle is being moved by a tow truck to a repair shop working with the insurance company that provides damage information to the insurance company. In such an event, the UAV 412 may be recalled since the repair shop is trusted by the insurance company to provide reliable damage information for vehicles it repairs. Alternatively, the insurance server 406 may detect that the vehicle's current location is inside a police station or parking garage that is inaccessible to the UAV 412. In this case, the insurance server 406 may recall the dispatched UAV 412. However, if the UAV 412 is detected to be in transit on an open road by a tow truck or by the driver of the vehicle back to the driver's home, the insurance server 412 may determine if the UAV 412 is within a threshold time (e.g., 5 minutes away, or other amount of time) and/or threshold distance (e.g., within 3 miles, or other amount of distance) for the UAV 412 to still be able to monitor the vehicle's condition while the vehicle is in transit on an open road or parked in an area accessible to the UAV 412. If the insurance server 406 determines that there is enough time for the UAV 412 to catch up to the vehicle in transit and perform damage inspection, the insurance server 406 may provide the UAV 412 with the currently updated located of the vehicle. The insurance server 406 may also determine whether to recall the dispatched UAV 412 based on who has taken control of the vehicle and is moving it. If the controlling party is a repair shop or a party that the insurance company trusts to provide the insurance server 406 with damage information used to perform claims calculation, the insurance server 406 may recall the UAV 412.

Although the example embodiment described in FIG. 4 has been described within the context of a vehicle being the insured property, the same principles described above with relation to FIG. 4 may extend to other types of insured property including real estate property. For example, the insurance server 406 may dispatch UAV 412 to inspect the condition of a real estate property when the real estate property has been damaged according to the techniques described above with relation to vehicle 404a and/or 404b.

Figure 5:
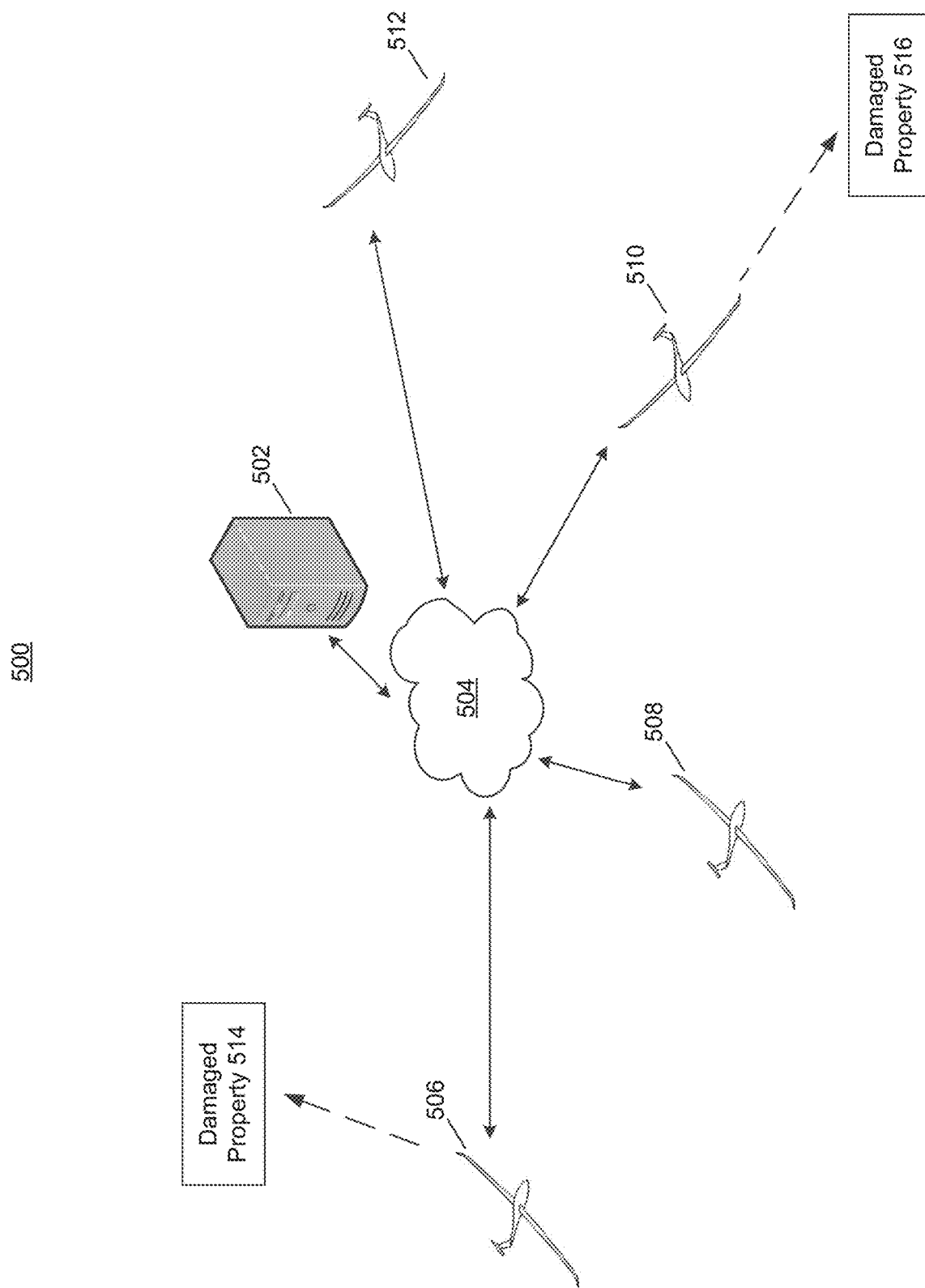
FIG. 5 illustrates an example environment in which multiple UAVs may communicate with a remote server according to one or more aspects described herein.

FIG. 5 illustrates an example environment 500 in which an insurance server 502 may communicate with multiple UAVs to collect information on different insured properties. The insurance server 502 may correspond to insurance server 206 of FIG. 2, insurance server 304 of FIG. 3, and insurance server 406 of FIG. 4. The insurance server 502 may communicate with multiple UAVs such as UAVs 506, 508, 510, and 512 over network 504. Each UAV 506, 508, 510, and 512 may correspond to UAV 204 of FIG. 2, UAV 302 of FIG. 3, and UAV 412 of FIG. 4. Network 502 may correspond to network 202 of FIG. 2, network 306 of FIG. 3, and network 410 of FIG. 4. Each one of UAVs 506, 508, 510, and 512 may be dispatched by the insurance server 502 to monitor a damaged property 514 or 516 closest to it. The damaged properties 514 and 516 may correspond to vehicles, real estate property, or any other type of property for which an insurance policyholder provides insurance coverage.

In some embodiments, the insurance server 502 may constantly track the location of each UAV 506, 508, 510, and 512 that it communicates with and/or manages. For example, each of the UAVs 506, 508, 510, and 512 may report their locations periodically to the insurance server 502, which may update a database of each UAV's location as the new locations are received. When the insurance server 502 receives a request to inspect a damaged property such as damaged property 514 from a particular policyholder and/or determines that a UAV needs to be dispatched to a scene of an accident, the insurance server 502 may determine which of UAVs 506, 508, 510, and 512 is located closest to the location of the damaged property 514. If the damaged property 514 is moving (e.g., vehicle), the insurance server 502 may factor in the speed of the moving damaged property 514 and the destination of the moving damaged property 514 in determining which UAV to dispatch to inspect the damaged property 514.

In some embodiments, the insurance server 502 may determine whether dispatching a UAV to inspect the insured property is a cost effective option to collect damage information. For example, dispatching a UAV to collect damage information, while advantageous, may be only one of several different methods for collecting damage information. Other methods for collecting damage information may be to have the policyholder take photos of the damaged property, to dispatch an insurance agent to the site of the damaged property. The insurance server 502 may associate costs with each of these options and evaluate the costs versus the benefits of these various options to determine which option to select. The costs of dispatching a UAV may include the cost of the fuel, wear and tear of the UAV, and average costs of using its sensors per inspection. The insurance server 502 may break down the fuel and wear and tear costs on an averaged per mile basis and calculate a cost estimate to dispatch the nearest UAV to a damaged property based on the total distance that the nearest UAV has to travel. Similarly, the UAV may calculate an average per mile cost of dispatching an insurance agent (e.g., including the insurance agent's per hour wage, transportation costs, and other allowances). In addition to estimating the monetary cost of using each of these options, the insurance server 502 may also weigh in the types of information that can be collected by each of these different options. For example, while dispatching a UAV may be more costly than having a policyholder upload photos of the damaged property using his mobile device, a UAV may be able to take various different measurements such as chemical sensors measurements, thermal measurements, take measurements of difficult to measure areas of the property and collect data on determined insurance risks of the damaged property. Such benefits of the UAV may be factored into the determination of which method the insurance server 502 decides to collect the insurance information. The type of information collected may be factored into a cost model for each available resource including UAVs.

As an example, the insurance server 502 may determine that property 514 needs to be inspected for damage. Such a determination may be made in response to receiving a claims request from an insurance policyholder associated with property 514 or in response to receiving an automated alert that property 514 has been damaged. Accordingly, the insurance server 502 may identify the current location of the damaged property 514 and identify which resources (e.g., nearest UAV, nearest insurance agent, if the policyholder is able to upload pictures of the damaged property using his mobile device) are available to report damage information to the insurance server 502. Once the insurance server 502 determines which existing resources are available to report damage information, the insurance server 502 may evaluate the overall costs of using each available resource factoring in the benefits and monetary costs of each resource given the location of the damaged property 514. In an exemplary instance, the insurance server 502 may determine that the damaged property is the $35^{th}$ floor of a skyscraper that is not accessible for anyone except a UAV to capture detailed damage information. In such an instance, the UAV is the only available resource and it is dispatched. However, in a different instance if the damaged property 514 is an automobile involved in an accident in a highway, the insurance server 502 may determine that the driver may take photos of the damaged portions of the automobile using his mobile device. An insurance agent may also be available to be dispatched and UAV 506 (the nearest UAV of the UAVs 506, 508, 510, and 512) may also be available to be dispatched to the location of the damaged property 514. The insurance server 502 may determine that given all of the available resources, dispatching the UAV 506 that is nearest to the damaged property is the most cost effective option of reporting as much information as needed to perform an accurate estimate of the damage to the vehicle.

In some embodiments, the insurance server 502 may dispatch multiple different UAVs to different damaged properties simultaneously. For example, if a request is received at the insurance server 502 from properties 514 and 516, the insurance server 502 determines the location of properties 514 and 516. Upon determining the location of the nearest UAVs to each of properties 514 and 516, the insurance server 502 may determining that dispatching UAVs is the most cost efficient and/or beneficial resource. Upon making such a determination, the insurance server 502 may identify that UAV 510 is the closest available UAV to the location of damaged property 516 and that UAV 506 is the closest available UAV to the location of the damaged property 514. The insurance server 502 may calculate trajectories for UAVs 506 and 510 to damaged properties 514 and 516, respectively and transmit such trajectories to the UAV 506 and 510, respectively.

The insurance server 502 may continuously communicate with multiple UAVs simultaneously and receive data from multiple such UAVs simultaneously. The insurance server 502 may accordingly manage a network of UAVs 506, 508, 510, and 512 shown in environment 500. The insurance server may communicate with UAVs through network 504. Network 504 may include one or more of a cellular network, a satellite communication network. The insurance server may communicate with different UAVs on different frequencies and/or channels of the network 504.

Figure 6:
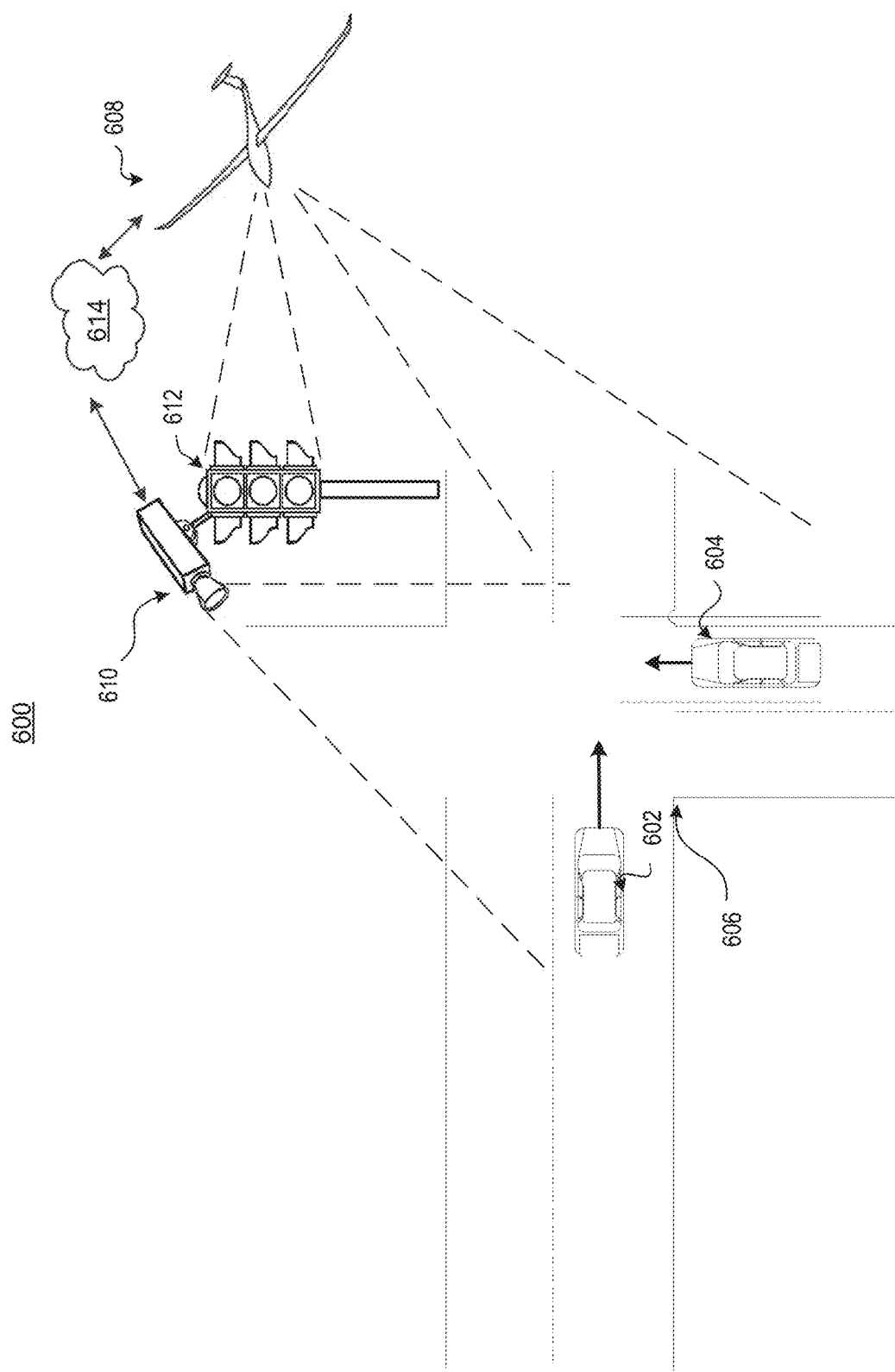
FIG. 6 illustrates an example environment in which information may be collected by a UAV on an insured vehicle near a traffic intersection according to one or more aspects described herein.

FIG. 6 illustrates an example environment 600 in which information may be collected by a UAV 608 on an insured vehicle near a traffic intersection 606. Example environment 600 illustrates a scenario in which vehicles 602 and 604 approach a traffic intersection 606 near a traffic light 612 and/or a traffic camera 610. As referred to herein, the traffic intersection 606 may refer to any segment of a road and/or a segment of a road near a traffic light 612 and/or a traffic camera 610. Vehicles 602 and 604 may correspond to vehicle 212 of FIG. 2, vehicles 404a and 404b of FIG. 4, and properties 514 and 516 of FIG. 5. UAV 608 may correspond to UAV 204 of FIG. 2, UAV 302 of FIG. 3, UAV 412 of FIG. 4, and any one of UAVs 506, 508, 510, and 512 of FIG. 5.

In some embodiments, once vehicles 602 and 604 are involved in a vehicle collision, hereinafter referred to as an accident, on or near a traffic intersection 606 and/or on or near a traffic light 612 and/or traffic camera 610, an insurance server may be notified of the accident. The traffic camera 610 may monitor all or a portion of the area of traffic intersection 606 and its surroundings and may transmit such information to a remote server that may detect that an accident has occurred on or near the traffic intersection 606. Additionally or alternatively, the traffic camera 610 may be activated and record images only when a special event (e.g., traffic violation occurs). For example, if a vehicle is detected to cross a particular intersection during a red light, the traffic camera 610 may record an image of the vehicle and/or driver who is violating traffic rules.

Once an accident is detected, the insurance server may be notified with details about the accident (e.g., the time of the accident, the vehicles involved in the accident, and/or the location of the accident). Additionally or alternatively, wireless transponders within vehicles 602 and/or 604 may alert the insurance server when they have been involved in such an accident. Additionally or alternatively, the individuals within the vehicle may provide the insurance server with the details of the accident by calling an insurance agent and/or by filing a claim request through a mobile device. Other parties such as a police office or a bystander may also provide the insurance server with the details of the accident.

In some embodiments, once the insurance server receives a notification of the accident, it may identify whether one or more of vehicles 604 and 604 are insured under its policy. In response to determining that at least one of vehicles 604 and 606 are insured under one of its policies, the insurance server may dispatch UAV 608 to perform damage analysis of the insured vehicle(s).

In some embodiments, the insurance server 504 may dispatch UAV 608 to collect damage information after the insurance server 504 has received an indication of the party at fault. For example, if a police officer or individuals involved in the accident have determined the party at fault (for example, the driver of vehicle 604) for the accident and have notified the insurance company which insures vehicle 604 of such an information, then the insurance server associated with vehicle 604's insurance company may instruct UAV 608 to collect damage information on one or more of vehicles 602 and 604. The UAV 608 may be instructed to travel to the location of both vehicle 602 and 604. If the insurance server detects that one or more vehicles has moved away, the insurance server may update the UAV 608 with the updated location(s) of these vehicles so that UAV 608 may complete damage data collection.

In some embodiments, the insurance server 504 may dispatch UAV 608 to collect information from the scene of the accident on or near traffic intersection 606. The UAV 608 may be dispatched upon determining that the accident has occurred within a vicinity of a traffic camera 610 and a traffic light 612. For example, the insurance server may determine whether the location of the accident is close enough to traffic camera 610 to have been recorded by traffic camera 610. Upon determining that the accident scene is within the vicinity of the traffic camera 610, the insurance server may dispatch the UAV 608 to the scene of the accident on or near intersection 606. Once the dispatched UAV 608 has reached the accident scene, the UAV 608 may identify the traffic camera 610. The UAV 608 and/or the insurance server may request to receive a video feed and/or images of the traffic intersection 606 at the time of the accident. For example, the UAV 608 may communicate over wireless internet or Bluetooth or any other network 614 with the traffic camera to retrieve images taken during the time of the accident. Additionally or alternatively, the insurance server may request a central traffic camera server to obtain footage from the identified traffic camera during a particular time of the accident.

In some embodiments, the UAV 608 may be instructed by the insurance server to monitor the traffic light signal 612 to determine the amount of time it takes for the traffic light signal 612 to switch between different signals. For example, the UAV 608 may monitor the duration of time the traffic light signal 612 maintains a stop signals (e.g., red light), the duration of time it maintains a yellow light, and the duration of time the traffic signal maintains a green light. The UAV 608 may also monitor if the traffic signals maintains a flashing red light, a flashing yellow light, or a flashing green light. If the accident involves a pedestrian or a bicyclist, the UAV 608 may also monitor a walk signal or a bike traffic signal if present at the traffic intersection to determine the time it takes to switch signals and the duration of time each signal is maintained. The UAV 608 may communicate such traffic light timing information to the insurance server. The insurance server may use such traffic light timing information to accurately predict the traffic signal that must have been displayed by the traffic light signal 612 at any given point of time.

By monitoring the traffic light signal 612, the insurance server may be able to correlate the accident footage obtained from the traffic camera 610 with the signal that the traffic light signal 612 should be displaying to identify whether the driver of one or more vehicles 602 and 604 was performing a traffic violation before the accident. If the traffic camera footage shows one or more vehicle 602 or 604 committing a traffic violation, the insurance server may be able to able to partially or fully apportion fault to that corresponding vehicle. For example, if the insurance server determines by correlating the traffic camera footage with traffic light timing information that vehicle 604 crossed traffic intersection 606 improperly during a red light and subsequently hit the vehicle 602, the fault for the accident lies with vehicle 602.

In some embodiments, the insurance server may instruct the UAV 608 to look for clues at the scene of the accident that is helpful to an investigation of determining which party is at fault for the accident. The insurance server may instruct the UAV 608 to use its onboard sensors to take measurements of evidence left by the vehicles such as point of impact of vehicle 602 and 604, the vehicles' final resting positions, skid marks, scrub marks, and gouge marks. These measurements may usually be taken using on-board sensors of the UAV 608. With this data collected from the onboard sensors of the UAV 608, a computer-generated scale diagram may be produced and may be used to reconstruct the accident scenario. For example, The UAV 608 may scan the area and take several photographs of skid marks on the road, broken vehicle components on or near the intersection 606, equipment wreckage, and damage to the road or structures near intersection 606 (e.g., dented guardrails, chipped sidewalks etc.). Such information that is present at the scene of the accident may be transmitted to the insurance server. Along with traffic camera footage, traffic light timing information, the data collected using the onboard sensors of the UAV 608 may assist an insurance agent to determine the fault by providing additional proof from the scene of the accident moments after the accident before the scene of the accident is altered by additional vehicles.

In some embodiments, in addition to collecting evidence from the scene of the accident, the UAV 608 may inspect various parts of each vehicle 602 and 604 at the scene of the accident. These inspections may include measuring the amount of damage and generating a damage profile of the vehicles 602 and 604. This information may be used to perform a reconstruction of the accidence scene by forensic experts and/or claim agents for fault determination and claim calculation. The UAV 608 may inspect the mechanical components of the vehicles 602 and 604 (e.g., brakes, steering, tires, suspension, lights, etc.) to determine if the condition of these components may have been a causative factor in the accident.

The UAV 608 may be programmed to automatically perform a series of tests if the UAV 608 observes specific scenarios at the scene of the accident. For example, if the UAV 608 detects that vehicle 604 has flipped over, the UAV 608 may attempt to measure the size, direction, and heat signatures of skid marks on the road along with traffic camera footage to measure the apparent speed of the vehicle 604 and to see how the driver may have attempted to brake along the road. The UAV 608 may examine the tires of vehicle 604 to examine the type of damage that they have sustained. Such evidence may be useful to an investigator to determine whether the fault was with the driver of vehicle 604 or due to vehicle malfunction (e.g., tire failure, engine failure, brake failure etc.).

In some embodiments, the UAV 608 may perform chemical tests on the vehicle 602 and/or 604 to determine whether the vehicles are leaking gas and/or to detect the presence of certain airborne chemicals that provide evidence of illegal substance abuse (e.g., narcotics and/or alcohol consumption). Additionally, the UAV 608 may measure the temperature of each component of the vehicle, which may be used in detecting how long each component has been running and active for.

In some embodiments, the UAV 608 may facilitate a videoconference between people at the scene of the accident and insurance agents and/or police officers. For example, the UAV 608 may enable a video call over network 614 between an eyewitness at the accident scene and an insurance agent, forensic expert, and/or police officer with access to a computing device capable of engaging in a video call. The UAV 608 may facilitate such a video call using its display screen, microphone, speakers, and camera. Additionally or alternatively, the UAV 608 may record eyewitness accounts at the scene of the accident for use by the insurance agent and/or forensic expert in determining which party is at fault and/or performing an insurance claims estimate.

In some embodiments, the UAV 608 may be instructed to monitor whether the vehicles that it is monitoring are being used for commercial use or for personal use as covered by the insurance policy. Personal vehicles such as vehicle 604 may often be used for commercial purposes when their drivers/owners may be using the vehicle 604 as a taxi and/or ridesharing service (e.g., Uber, Lyft, Sidecar, Gett, etc.). As part of several different ridesharing services policies and/or to identify the vehicle 604 as part of a ridesharing and/or taxi service, when the vehicle 604 is being used for such commercial ridesharing and/or taxi services, a sticker/decal/identifying mark is often placed on the vehicle 604 to be easily visible to onlookers and/or the public. When the vehicle 604 is not being used for a commercial purpose (e.g., as part of the ridesharing service), the sticker/decal/identifying mark may be removed from display on the vehicle 604. When a personal vehicle such as vehicle 604 is not being used for personal use according to the terms of the insurance policy coverage of the driver/owner's vehicle insurance policy for the vehicle 604 but is being used for a commercial purpose (e.g., ridesharing and/or taxi service) that is outside the scope of its insurance policy coverage, the insurance organization may not be liable for damage to the vehicle 604 and may not provide any insurance coverage during such commercial user of the vehicle 604. Accordingly, the UAV 608 may be instructed to determine whether the vehicle, of which it is to inspect the condition, is exhibiting a sticker/decal/marking identifying that it is being used for a commercial purpose before the UAV 608 is to initiate collection of damage information and/or assesses the condition of the vehicle. For example, the UAV 608, which may have been instructed to and/or determined to monitor the condition of vehicle 604, may inspect the vehicle 604 for signs of a sticker, decal, and/or any marking that could indicate the vehicle 604 is being used for commercial purposes at the time when the UAV 608 is about to otherwise collect information about its condition.

In some embodiments, vehicles that are being used for a commercial purpose during a period of time may not be monitored and/or inspected during that period of time by UAV 608. For example, once the UAV 608 detects that the vehicle 604 exhibits a sticker/decal/identifying mark indicating that it is being used for a ridesharing service instead of personal use, the UAV 608 may determine that the condition of vehicle 604 is not to be monitored until the sticker/decal/identifying mark indicating vehicle 604's commercial use is removed. The UAV 608 may communicate, to the insurance server, that the vehicle 604 is being used for a commercial purpose and that it exhibits the detected sticker/decal/identifying mark and may receive instructions from the insurance server to not inspect the condition of the vehicle 604 and/or to collects its damage information. The insurance server may instruct the UAV 608 to continue monitoring whether the vehicle 604 still exhibits the sticker/decal/identifying mark. The insurance server may further instruct the UAV 608 to avoid collecting damage information and/or monitor the condition of the vehicle 604 until the UAV 608 does not remove the sticker/decal/identifying mark indicating its commercial use.

In some embodiments, the UAV 608 may inspect vehicles for indicators of commercial use using one or more of its onboard sensors. For example, the UAV 608 may use one or more of its onboard cameras, infrared sensors, and/or other image sensors to optically detect the presence of a visible sticker/decal/identifying mark. Additionally or alternatively, the UAV 608 may also use an RF sensor to detect an RF sticker/decal/signal emanating from the vehicle indicating that it is being used for a commercial purpose. For example, the UAV 608 may use a Bluetooth radio and/or antennae to detect wireless/RF signals emanating from the vehicle indicating its communication with a ridesharing service. The UAV 608 may also be configured to intercept communications from mobile devices in the vehicle to determine whether a mobile device of a driver of the vehicle 604 is engaged as a driver of the vehicle 604 in a ridesharing/commercial manner.

Figure 7:
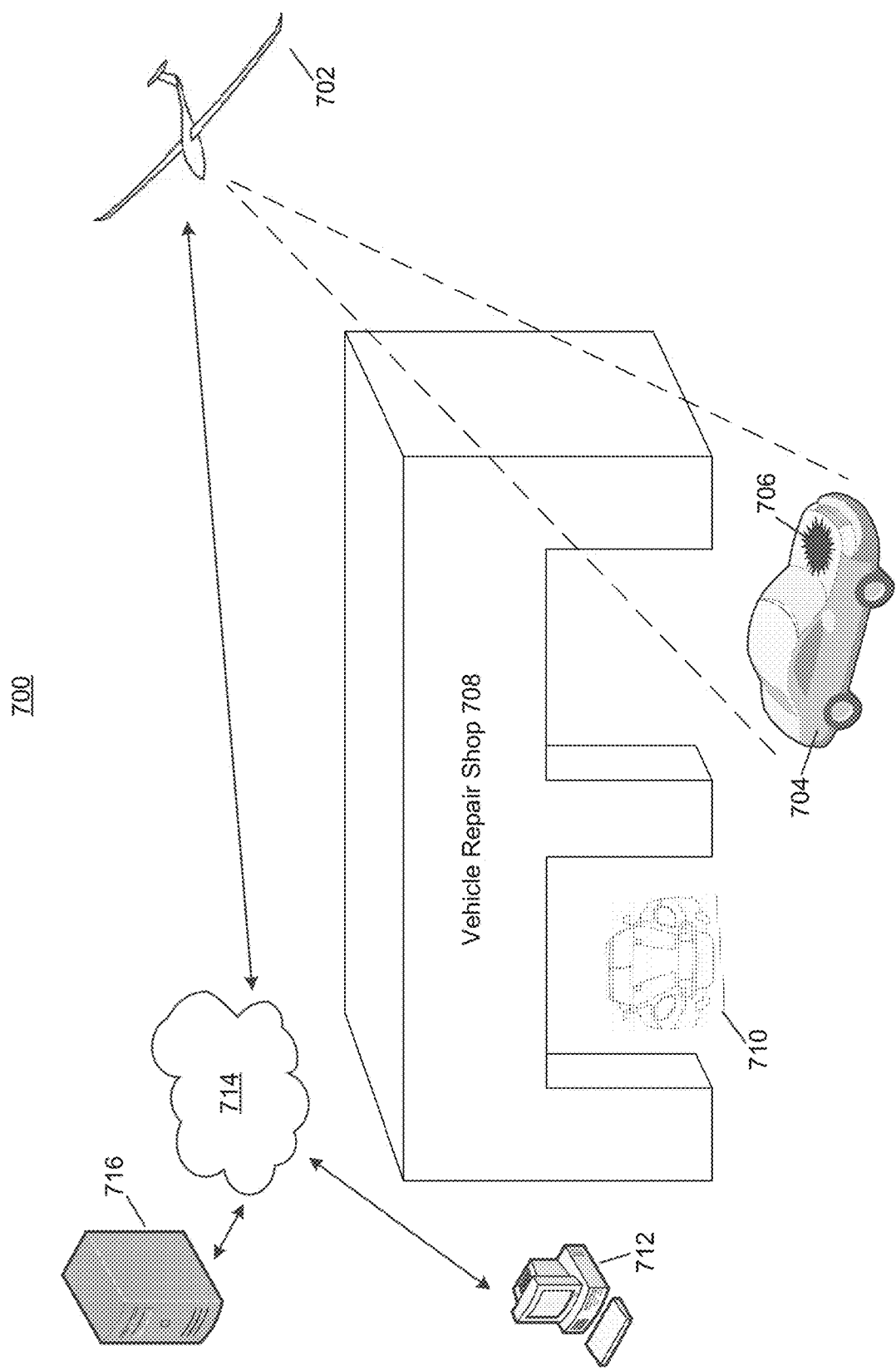
FIG. 7 illustrates an example environment in which information may be collected by a UAV on an insured vehicle near a vehicle repair shop according to one or more aspects described herein.

FIG. 7 illustrates an example environment 700 in which information may be collected by a UAV on an insured vehicle near a vehicle repair shop. A vehicle that has been damaged and for which an insurance claim has been filed may be located at the vehicle repair shop 708 after sustaining damage. The insurance company may dispatch UAV 702 to inspect the damage to the vehicle before the vehicle is repaired. In the example embodiment shown in FIG. 7, the insurance server 716 communicates with the UAV 702 over network 714 and with a computing device located on the premises of the vehicle repair shop 708. Vehicles 704 and 710 may be located at the premises of the vehicle repair shop 708 for repairs. Vehicles 704 and 710 may correspond to vehicle 212 of FIG. 2, vehicles 404a and 404b of FIG. 4, properties 514 and 516 of FIG. 5, vehicles 602 and 604 of FIG. 6. UAV 702 may correspond to UAV 204 of FIG. 2, UAV 302 of FIG. 3, UAV 412 of FIG. 4, any one of UAVs 506, 508, 510, and 512 of FIG. 5, and UAV 608 of FIG. 6. The insurance server 716 may correspond to insurance server 206 of FIG. 2, insurance server 304 of FIG. 3, insurance server 406 of FIG. 4, and insurance server 502 of FIG. 5.

Once an insurance policyholder files a claim request and indicates that his vehicle 704 is at the vehicle repair shop 708, the insurance server 716 may instruct the nearest UAV to the repair shop 708 (e.g., UAV 702) to go to the location of the repair shop 708 to inspect the condition of the vehicle 704 and report the condition to the insurance server 716 for claims processing. Additionally or alternatively, the insurance server 716 may dispatch UAV 702 to the repair shop 708 upon receiving a signal from a wireless communication device of vehicle 704 indicating that the vehicle 704 has been involved in an accident and that the vehicle 704 is currently located at the repair shop 708 and/or is en route to the vehicle repair shop 708.

In some embodiments, the insurance server 716 may instruct the UAV 702 to inspect the condition of vehicle 704 before it is repaired by the repair shop. If the insurance server 716 detects that vehicle 704 has been taken to a repair shop that is outside of the insurance company's trusted network of repair shops (e.g., out of network automobile repair shop), the insurance server 716 may immediately dispatch the nearest UAV to inspect the condition of the vehicle 704 before the vehicle repair shop repairs it. By examining the condition of the vehicle 704 and identifying any and all damages to the vehicle 704, the UAV 702 may provide the insurance server 716 with a list of damages to the vehicle 704 before the vehicle 704 is repaired. The insurance server 716 may also receive an invoice and/or a list of damages for the vehicle 704 from the vehicle repair shop 708 that the vehicle repair shop 708 claims to have repaired. The insurance server 716 may compare the list of damages that the vehicle repair shop 708 claims to have repaired against damages identified by the UAV 702 to verify whether the vehicle repair shop 708 is fraudulently claiming to have detected damages on the vehicle 704 that were not detected by a UAV 702 before the vehicle was repaired. For example, the insurance server 716 may receive an invoice and/or a list of damages identified by the repair shop 708 from a computing device 712 associated with and/or located on the premises of the repair shop 708 over network 714 or any other network. In other embodiments, the insurance server 716 may verify the extent of the damages that the vehicle repair shop 708 claims that vehicle 704 had incurred before it was repaired by comparing such a report from the vehicle repair shop 708 against the damage inspection results obtained from UAV 702.

The UAV 702 may examine the condition of one or more of vehicles 704 and 710 using its onboard sensors and may report such information to insurance server 716. The UAV 702 may take photos and measurements of all damages detected on the vehicle. For example, the UAV 702 may detect that the vehicle 704 has sustained body damage 706 by detecting it using one or more of its onboard sensors. The UAV 702 may transmit all collected damage information to the insurance server 716 for claim processing and/or further damage analysis. In some embodiments, the insurance server 716 may instruct the UAV 702 to perform additional tests and collect different data once the server receives initial inspection from the UAV 702. For example, the insurance server 716 may instruct UAV 702 to check the engine or the exhaust for an oil leak if the UAV 702 reports detecting smoke from the vehicle 704. Once the insurance server 716 receives images of smoke captured from the UAV 608, the insurance server 716 may instruct UAV 702 to use its onboard chemical sensor to detect the presence of oil in components of the vehicle (e.g., engine and exhaust) in which oil may have leaked.

In some embodiments, the UAV 702 may detect whether the vehicle that it has been dispatched to inspect is parked outside a vehicle repair shop 708 or whether the vehicle is inaccessible for damage inspection by the UAV 702. For example, once the UAV 702 arrives at the location of the vehicle repair shop 708 to inspect vehicle 704, the UAV 702 may use its cameras to detect whether the vehicle 704 is located outside the repair shop 708 and/or it is accessible for damage inspection. As shown in FIG. 7, the vehicle repair shop 708 may have a vehicle 710 parked within the repair shop and it may also have a vehicle 704 parked outside in the parking lot of the repair shop 708. If the UAV 702 cannot locate the vehicle 704, it may use other sensors (e.g., hyperspectral image sensors, IR camera, heat sensor, etc.) to detect whether the vehicle 704 is located within the repair shop 704. If it detects that the vehicle 704 is within the repair shop 708 and/or is inaccessible for damage inspection, the UAV 702 may alert the repair shop 708 (e.g., by calling a telephone number associated with the vehicle repair shop 708 and/or one or more of its employees, by playing back a message over its speakers, by making a loud noise using onboard sirens, by transmitting a message to computing device 712 in the repair shop 708, etc.) that it has arrived and request that vehicle 704 be made accessible for damage inspection.

In some embodiments, the UAV 702 may coordinate with a vehicle repair shop 708 mechanic to accurately capture damage information. For example, once the UAV 702 arrives at the location of the repair shop 708, the UAV 702 may alert one or more mechanics and/or employees of the vehicle repair shop 708 to provide the UAV 702 with access to different components of the vehicle 704 for the UAV 702 to perform a detailed damage inspection. Either the UAV 702 or the insurance server 716 may send a message to one or more repair shop 708 employees (via computing device 712 at the repair shop and/or via one or more telephones of the repair shop and/or its employees) to help assist the UAV 702 in its damage inspection. As the UAV 702 performs damage inspection of the vehicle, the UAV 702 may need certain components of the vehicle to be opened and/or lifted in order to get a better photograph of the damaged part and/or perform tests and/or record measurements of the components. The UAV 702 may inform the mechanic assisting the UAV 702 to perform such maneuvers on the vehicle to help the UAV 702 perform its damage inspection. While the UAV 702 is performing its tests and is instructed by the insurance server 716 to perform additional measurements based on the conditions detected from an initial damage inspection, the UAV 702 may instruct the mechanic to provide additional assistance.

Although the example embodiment described in FIG. 7 has been described within the context of a vehicle being the insured property, the same principles described above with relation to FIG. 2 may extend to other types of insured property. For example, the insurance server 716 may dispatch UAV 702 to inspect the condition of an insured commercial equipment being repaired at a repair shop according to the techniques described above with relation to vehicle 704.

Figure 8:
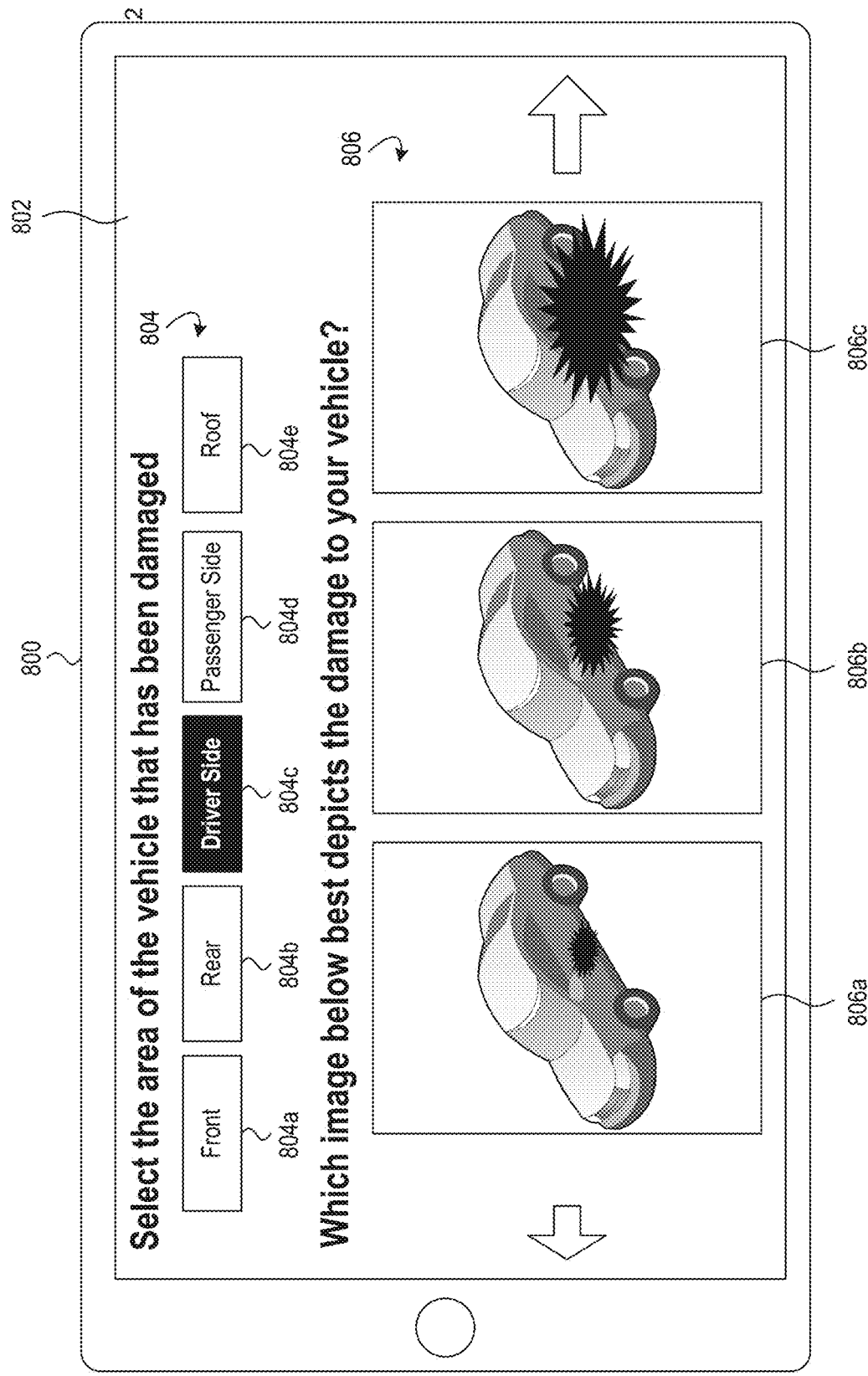
FIG. 8 illustrates an example display screen of a mobile application used to report a condition of the insured property according to one or more aspects described herein.

FIG. 8 illustrates an example display screen of a mobile application used to report a condition of the insured property according to one or more aspects described herein.

As described in further detail below, an enhanced claims processing system may collect damage information from the user via images selected by the user that best represent the damage to the item. Referring to FIG. 8, an example of an implementation of a damage collection device 800 is shown at which a damage information collector 802 resides. The damage collection device 800 may be an insurance policyholder's mobile device or a computing device. An insurance policyholder may file an insurance claim using his mobile device. A mobile application on a mobile user device may result in the damage collection device 800. Once a user is involved in an accident or wishes to report a claim for damaged property, the user may open such a mobile application and report the condition of the damaged property. The user may provide proof of damage to an insurance server using either the camera or any sensors of the damage collection device 800. The insurance server may use such user provided proof of damage and/or details about the damaged property and/or accident to process an insurance claims request. The insurance server may determine whether further damage information is required to supplement the information received from the damage collection device 800. If such information is required to process an insurance claim, the insurance server may dispatch a UAV to perform damage inspection to capture additional damage information required to process the claim.

The damage information collector 802, in this example, is configured to collect damage information regarding damage to a vehicle. As seen in FIG. 8, the damage information collector 802 presents a set of input elements 804 (collectively) the user may use to identify portions of the vehicle that has been damaged. The damage information collector 802, in this example, includes input elements for selecting areas of the vehicle that have been damaged, e.g., a "front" input element 804a, a "rear" input element 804b, a "driver side" input element 804c, a "passenger side" element 804d, and a "roof" element 804e.

The set of elements 804 illustrated in FIG. 8 are shown by way of example only. Other implementations of the damage information collector may include additional or alternative input elements. In some implementations, for example, the set of input elements may include more granular areas of a vehicle, e.g., respective input elements for the "front," "right," "left," "rear," "top," "front right side," "rear right side," "front left side," "rear left side," "front right," "front left," "rear right," "rear left," "window area," "windshield area," "panel area," "door area," "wheel area," and other areas of the vehicle. In addition, some example implementations may include input elements for selecting individual components of the vehicle have been damaged such as, e.g., "front windshield," "rear windshield," "front right headlight," "front left headlight," "rear right brake light," "rear left brake light," "front windshield," "rear windshield," "front bumper," "rear bumper," "hood," "trunk," "roof," "panel," "front left door," "front left window," "rear left door," "rear left window," "front right door," "front right window," "rear right door," "rear right window," "left side mirror," "right side mirror," "front left tire," "rear left tire," "front right tire," "rear right tire," and other components of the vehicle. Other types of items may include additional and alternative areas and components that will be appreciated with the benefit of this disclosure. Areas of an item may include multiple components of the item, e.g., a "front right side" area of a vehicle may include the front bumper, hood, and front right headlight of the vehicle.

The set of input elements may also include input elements that allow the user to select the type of damage that occurred to the selected portion of the item, e.g., dent, puncture, fire, detachment, crack, shatter, etc. Having selected an input element to indicate the portion of the item that was damaged, the claimant may then select an input element to indicate the type of damage that occurred. The damage information collector 802 may allow the user to select multiple input elements to indicate the type of damage that occurred, e.g., if the damage to a portion of a vehicle includes both dents and punctures.

The damage information collector 802 may also present a series of images 806 (collectively) that depict increasing degrees of damage to the selected area or component of a reference item. Each image in the series of images 806 may depict relatively more damage than the image that preceded it. For reference, the first image in the series of images 806 may, for example, depict no damage to the area or component of the reference item. The claimant may then scroll through the series of images 806 to select which image best depicts the damage to the item associated with the insurance claim made. As shown by way of example in FIG. 8, the "left side" input element 804c has been selected, and the series of images 806 include images that depict increasing degrees of damage to the left side of a reference vehicle. In this example, image 806a depicts a relatively small amount of damage to the left side of the reference vehicle, image 806b depicts a relatively moderate amount of damage to the left side of the reference vehicle, and image 806c depicts a relatively large amount of damage to the left side of the reference vehicle. Other images in the series of images 806 may depict relatively more or less damage to the reference vehicle. In addition, the series of images may be selected such that they depict the type of damage indicated by the claimant via the selection of input elements corresponding to the type of damage that occurred. Some of the images presented to the claimant may depict the entirety of the reference item, and some of the images presented to the claimant may only depict portions of the reference item, e.g., close-up images on various areas or components of the reference item. The series of images may be a series of photos of the reference item, a series of graphical representations of the reference item, and combinations thereof.

In addition, the damaged item and the reference item may be of the same item type. As an example the reference item depicted in the series of images may have the same model number as the damaged item. Where the damaged item is a vehicle, for example, the reference item may depict a vehicle having the same make, model, and year as the damaged vehicle. In some example implementations, the damaged item and the reference item may be different—but similar—item types, e.g., items that are similar but having different model numbers. Where the damaged item is a vehicle, for example, the reference item may be a vehicle having a different year than the damaged vehicle. In some example implementations, an estimated cost to repair the damaged item may be determined even where the series of images depict an item of a different make or model, e.g., a different vehicle make, model, and year. Knowing the item type of the damaged item and the areas and components that were damaged may be sufficient to estimate a cost to repair the item even when the damage information is collected using depictions of a different type of reference item.

The claimant may select as many areas or components of the item as necessary to comprehensively indicate the damage to the item. The damage information collector 802 may identify the images selected by the user in the damage information transmitted to the enhanced claims processing system. As described in further detail below, the damage collection device 800 may be in signal communication with the enhanced claims processing server (e.g., insurance server) to transmit communications identifying the portions of the damages item selected by the claimant, receive communications that include the series of images corresponding to the damage portions selected, and transmit communications identifying the images selected by the claimant as best representing the damage to the item.

Although the example embodiment described in FIG. 8 has been described within the context of a vehicle being the insured property, the same principles described above with relation to FIG. 8 may extend to other types of insured property including real estate property. For example, the damage collection device 800 may allow a user to upload images of property damage to their real estate property to submit a claims request and/or request a UAV to perform detailed damage inspection of their real estate property.

the insurance server may dispatch UAV 204 to inspect the condition of a real estate property according to the techniques described above with relation to vehicle 212.

FIGS. 9A-9D illustrate an example environment in which a UAV performs damage assessment on an insured real estate property. In the example embodiments illustrated in FIGS. 9A-9D, UAV 902 inspects a real estate property 904. The real estate property 904 may be a commercial real estate property or a personal real estate property (e.g., personal residence). The real estate property 904 may include a building and the land that it is built upon. Additionally or alternatively, the real estate property 904 may also include other structures in addition to buildings such as fences, swimming pools, pergolas, gazebos, balustrades, belvederes, gardens, greenhouse, gates, terraces, trellises, ponds, water structures, fountains, rock features, sidewalks, etc. The real estate property may also have adjacent structures such as tree 906 that may be classified as an insurance risk. For example, an insurance company may classify a tree 906 located near the real estate property 904 which is capable of damaging the real estate property by falling on it as an insurance risk.

In some embodiments, the UAV 902 may periodically fly over a neighborhood or a region containing several real estate properties such as real estate property 904 and collect information about the condition of the real estate properties in that region that are insured by the insurance company using UAV 902. For example, UAV 902 may identify all the real estate properties insured by its associated insurance company in a given region that it is flying over. Upon identifying the insured real estate properties, the UAV 902 may collect information about the condition of the insured real estate properties as it is flying over them. The UAV 902 may take pictures of their roofs and identify any roof damage during such routine flyovers. Additionally or alternatively, the UAV 902 may use other sensors (infrared camera, night vision camera, chemical sensor, heat sensor, hyperspectral image sensor etc.) to detect any damages to the insured properties in an area over which it is flying over as part of a routine flyby.

During a routine flyover, the UAV 902 may also identify existing potential insurance risks to the insurance company's insured real estate properties such as a towering tree 906 located close to real estate property 904. The UAV 902 may also identify potential hazards (e.g., fire, flood, hurricane, tornado, earthquake, volcano, storm, etc.) in an area in which one or more of its insured real estate properties exist during a routine flyover. Upon detecting such an insurance risk, the UAV 902 may alert the insurance server of such a risk and/or travel to one or more insured real estate properties in the region affected by the potential hazard to perform detailed damage inspection of the insured real estate property. The UAV 902 may notify the occupants of the insured real estate property of the potential hazard so that the occupants may take precautionary measures. If the UAV 902 detects that the insured real estate property is affected by the hazard, the UAV 902 may use one or more of its sensors to collect detailed damage information about the real estate property. In some examples, the UAV may collect the information about the property (e.g., real estate, vehicle, etc.), transmit it to an insurance server, and prepare a claim with a calculated insurance payout, all without the insurance policyholder even submitting a formal claim request. Then, the UAV (or through other communication means, e.g., e-mail, text message, phone call) may deliver the proposed calculated insurance payout to the policyholder for review/acceptance. As such, an insurance policyholder may receive remedy for incurred damaged even before first notice of loss (FNOL).

Figure 9A:
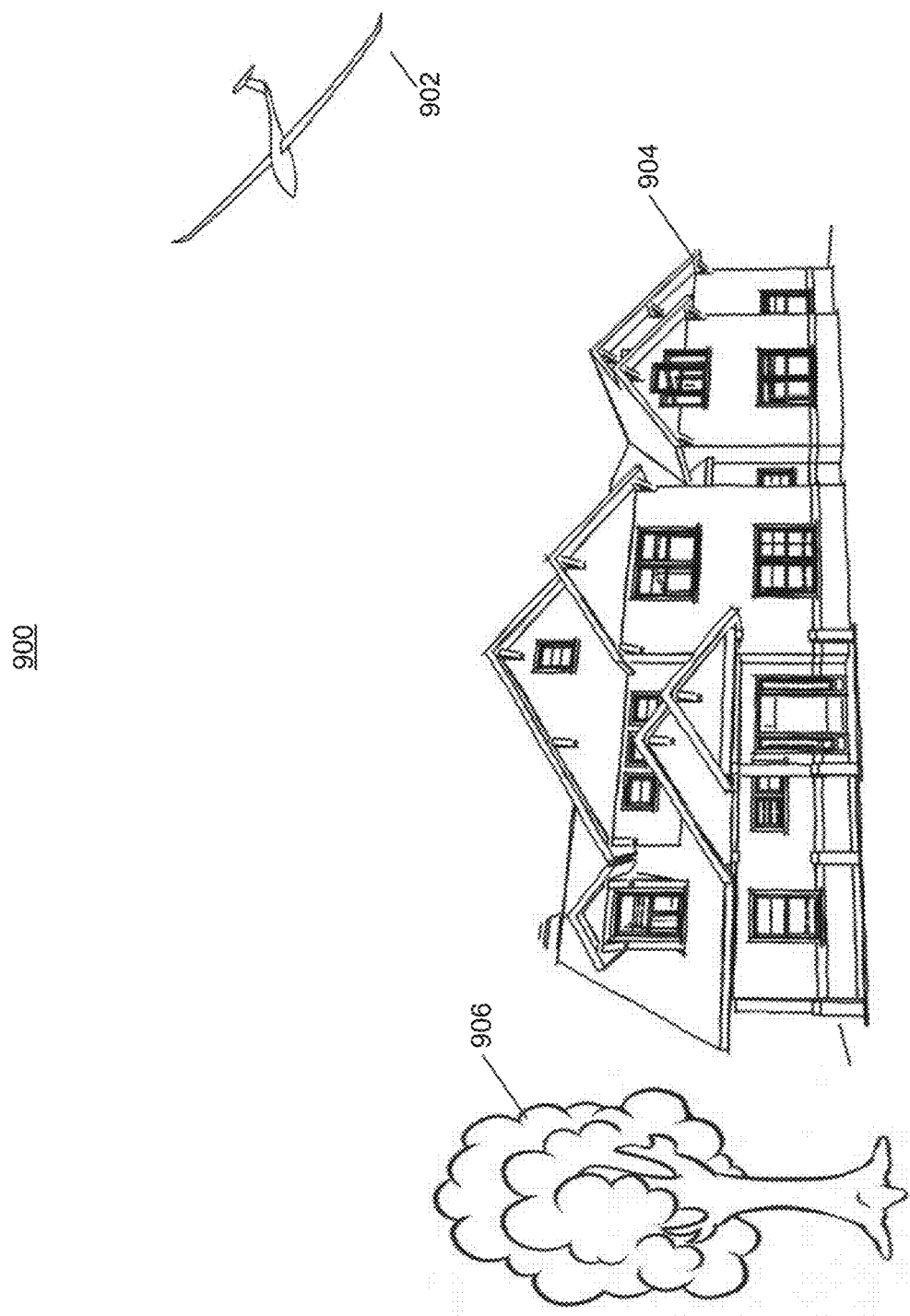

As shown in FIG. 9A, the UAV 902 may fly over an insured real estate property 902 during its routine flyover. The UAV 902 may scan the real estate property 904 for any damage and for any nearby hazards or insurance risks during such a routine flyover. The UAV 902 may periodically perform such a flyover. Additionally or alternatively, the UAV 902 may fly over insured properties when it is en route to a damaged property. For example, if the UAV 902 is travelling from point A to a point B to which it is dispatched (e.g., the location of the damaged property), the UAV 902 may inspect the condition of any insured real estate properties that fall in its trajectory between point A and point B. In some embodiments, the insurance server may calculate a trajectory from the current location of UAV 902 to a location to which it will be dispatched such that it covers the maximum amount of insured real estate properties along the way from the current location to the dispatch location. The UAV 902 may transmit the condition of the insured real estate properties during such a flyby to the insurance server. If the insurance server detects that one or more real estate properties has been damaged, it may dispatch additional UAVs to such real estate properties to perform a detailed damage inspection.

In some embodiments, the UAV 902 may flag insurance risks associated with real estate properties during such a flyover inspection. As the UAV 902 flies over a real estate property 904, it may use its overhead sensors such as camera, night vision camera, LIDAR, radar, etc. to detect that the location of certain objects near the real estate property 904 may pose an insurance risks to the real estate property 904. For example, the UAV 902 may use camera or night vision camera to detect that a tree 906 is located near the real estate property 904. The UAV 902 may further detect the dimensions, height, and distance from real estate property 904 of such potential risks by using LIDAR, radar, and other onboard geo-mapping sensors. For example, the UAV 902 may detect that tree 906 is tall enough and located close enough to real estate property 904 to inflict serious damage if it falls on the real estate property 904. By using cameras, the UAV 902 may detect the presence of exposed or damaged wiring in or outside a building of the real estate property 904, beehives, animal and/or pest infestation, fungus and/or mold, water damage, rust in the building, clogged chimneys, and other physically detectable forms of insurance risks to the real estate property 904.

In some embodiments, the UAV 902 may detect the presence of insurance risks using chemical and hyperspectral image sensors. For example, the UAV 902 may detect the chemical composition of certain materials in or near the real estate property 904 that pose an insurance risk to the property 904 using such sensors. For example, the UAV 904 may detect the presence of large amounts of carbon monoxide, radon, mold, gas leak, methane, and/or other dangerous chemicals that may either cause a fire, damage the real estate property 904, and/or cause harm to the occupants of the real estate property 904. The UAV 902 may use its onboard thermal sensors and/or infrared sensors to detect temperatures of certain components of the real estate property 904 that are outside the normal temperate range of such components. For example, the UAV 902 may detect the presence of overheating air conditioners, transformers, and other electrical appliances. The UAV 902 may also detect the presence of frozen pipes.

Once the insurance server receives such potential risk data from UAV 902, information from the insurance server may be inputted into an insurance premium rating system as one of several factors to be used to determine the pricing of the insurance policy premium of the insurance policyholder associated with real estate property 904. By detecting insurance risks for each real estate property, the insurance server may factor into account the insurance risks posed by the real estate property to provide an accurate quote and/or an insurance premium price. Additionally or alternatively, by detecting insurance risks for a real estate property, the insurance server may notify the insurance policyholder associated with the real estate property 904 of the insurance risk. For example, the insurance server may notify the insurance policyholder associated with real estate property 904 that the tree 906 poses an insurance risk and to chop down the tree to minimize the risk of future damage to the property 904.

The UAV 902 may perform such early detection for real estate properties associated with its insurance policyholders. In some embodiments, UAV 902 may perform such early detection for real estate properties associated with prospective new insurance policyholders.

Figure 9B:
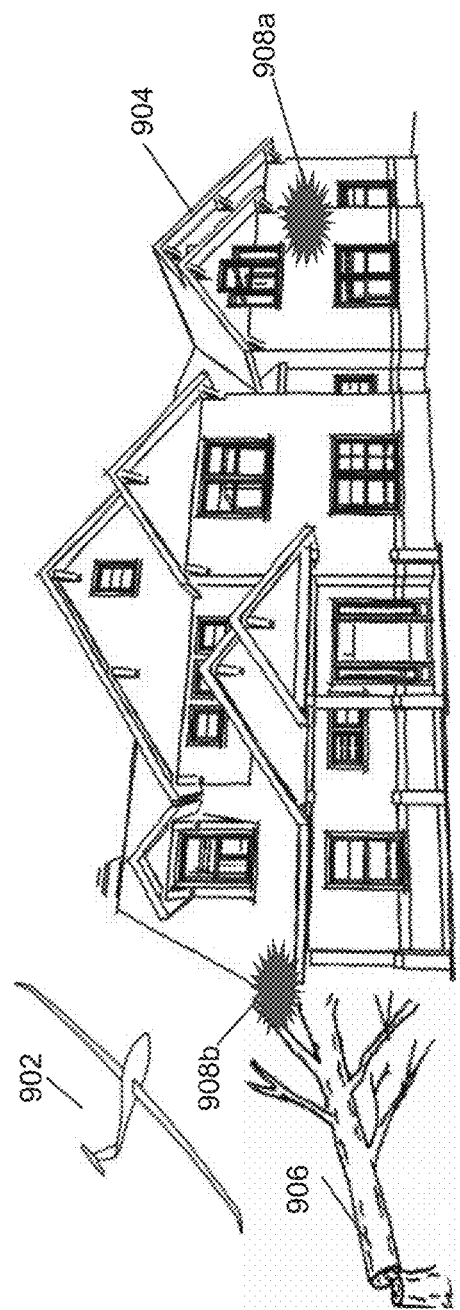
Figure 9D:
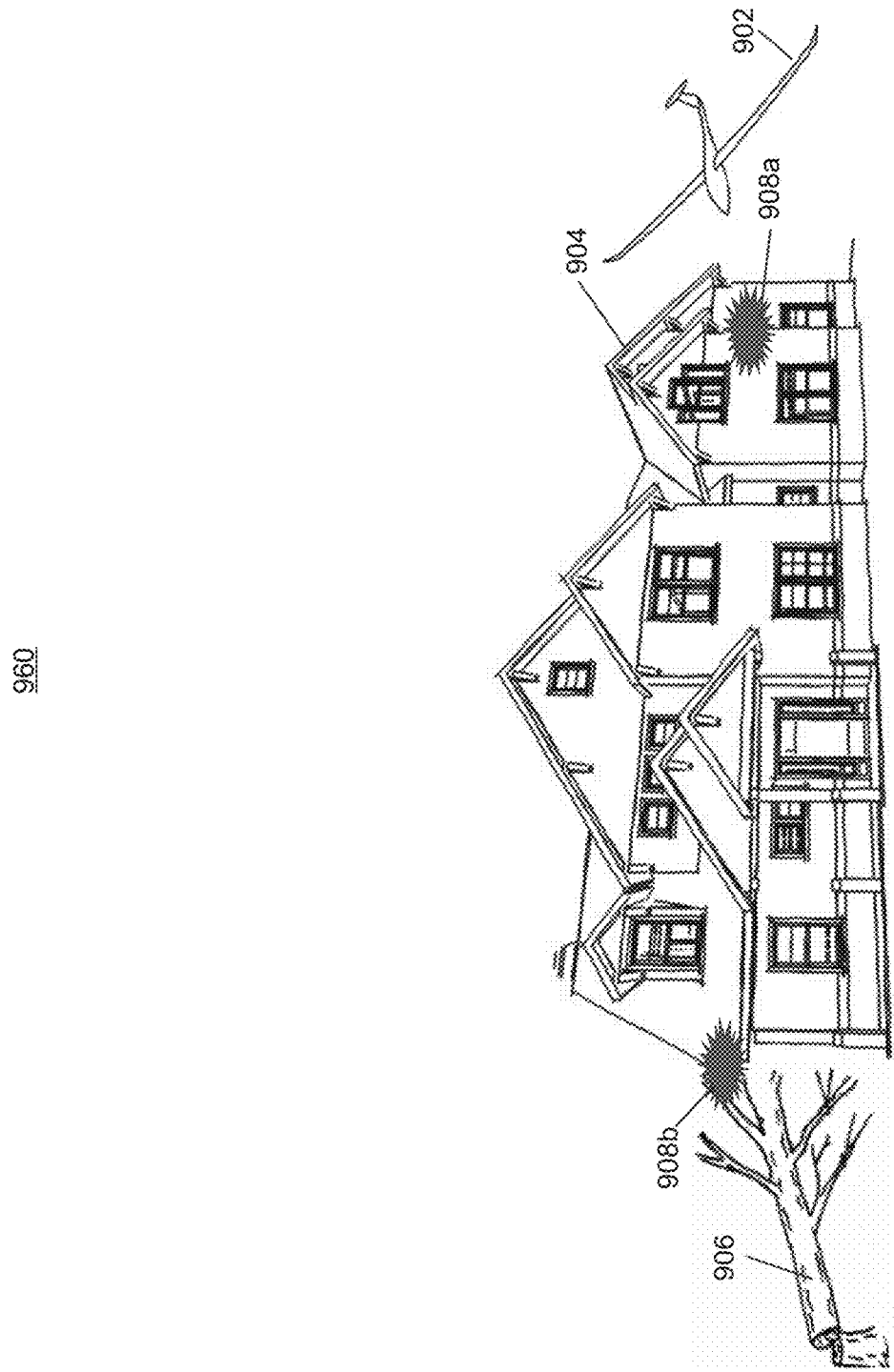

As shown in FIGS. 9B, 9C, and 9D, the UAV 902 may travel to the real estate property 904 to perform a detailed damage inspection of the real estate property 904 on an on-demand basis. The UAV 902 may travel to the location of the real estate property 904 once an insurance server dispatches it to perform a detailed inspection of that property. The insurance server may dispatch UAV 902 in response to a received claims request from the insurance policyholder of the real estate property 904 reporting damage to the real estate property. Additionally or alternatively, the insurance server may dispatch UAV 902 to the real estate property 904 upon determining that an incident has occurred at the real estate property 904 based on information that it may have received from other sources (e.g., other UAV flybys, police reports, news, weather service alerts, etc.).

In some embodiments, the UAV 902 may inspect the real estate property 904 and look for signs of damage. Once the UAV 902 arrives at the location of the real estate property 904, it may examine all aspects of the real estate property 904 from as many vantage points as possible using one or more of its onboard sensors to detect all possible types of property damage. The UAV 902 may be programmed to detect a list of different possible types of property damage and may be programmed to perform a series of different tests and collect a set of evidence for each home inspection using one or more of its onboard sensors.

In some embodiments, the UAV 902 may be configured to inspect the grounds of the real estate property 904. The UAV 902 may use its cameras to detect whether there is proper drainage away from a building of the real estate property 904. The UAV 902 may examine the real estate property 904 using cameras for signs of standing water, leaks from septic tanks, etc. The UAV 902 may use its chemical sensors and/or hyperspectral image sensor to detect for signs of rotting wood or rust in exterior structures (e.g., fences, sheds, railing, terrace, deck, etc.). The UAV 902 may be programmed to detect damage from its captured images or collected data by comparing it to baseline images and/or detecting features in the images or collected data and processing them against input rules for detecting damage from such collected images and/or data.

In some embodiments, the UAV 902 may be configured to inspect the structure of the real estate property 904. For example, the UAV 902 may be configured to use its cameras and/or LIDAR sensor to measure whether the ride and fascia board lines of the structure appear straight and level, whether the sides of the building appear straight and level, whether any window frames and doorframes appear straight, and whether there are any cracks in the building structure. The UAV 902 may use onboard cameras and/or LIDAR, or other sensors to detect whether there are any cracks, rot, or signs of water damage in the walls, stucco, siding, roof, doors, windows etc. The UAV 902 may use its cameras to detect whether any vines or shrubbery are growing on the building of the real estate property 904. The UAV 902 may inspect whether any glass used in the house is cracked. The UAV 902 may use cameras or chemical sensors to detect whether there is any rot or decay in the roof. In some embodiments, the UAV 902 may detect for evidence of moisture and excessive dampness in the basement or other parts of a building of the real estate property 904 using chemical sensors and/or thermal sensors. The UAV 902 may use its cameras to detect exposed foundation and/or exposed wiring. The UAV 902 may use pressure sensors to detect the appropriate amount of water pressure in the plumbing of the real estate property 904. The UAV 902 may use pressure sensors to detect that there is adequate airflow from the vents of the real estate property 904. The UAV 904 may use chemical sensors to detect that the air filtration system in a building of the real estate property is working adequately.

In the example embodiment shown in FIGS. 9B, 9C, and 9D, the real estate property 904 may have sustained damage 908a on the front wall from water damage and damage 908b from tree 906 falling on the roof of real estate property 904 after a storm. The UAV 902 may have been dispatched to the real estate property 904 after the insurance policyholder of real estate property 904 submitted an insurance claims request for one or more damages 908a and 908b or in response to determining that a dangerous storm capable of causing property damage has passed through the location of real estate property 904 (i.e., without an insurance policyholder having actually even submitted an insurance claims request yet).

As illustrated in FIGS. 9B and 9C, the UAV 902 may capture images and collect data for damage 908b from multiple different angles and vantage points. The UAV 902 may identify that the roof is damaged due to falling tree 906 and communicate such information to an insurance server. The insurance server may identify whether the tree 906 that may have caused the damage 908b was previously identified as an insurance risk to the real estate property 904 and whether the insurance policyholder had been warned to remove that insurance risk by chopping down or trimming the tree. If the insurance server determines that the insurance policyholder had been notified of such an insurance risk previously and done nothing to mitigate the insurance risk, the insurance server may adjust the claims calculation to provide very little or no damage recuperation payment to the insurance policyholder. Additionally or alternatively, the insurance server may adjust the insurance premium of the insurance policyholder upon detecting that the insurance policyholder shows evidence of being in non-compliance with recommendations for reducing risk.

As illustrated in FIG. 9D, the UAV 902 may fly around the real estate property 904 and detect signs of damages that may not have been identified in any claims request received by the insurance server. For example, the UAV 902 may detect water damage 908a on the front wall of the building of real estate property 904 that may not have been reported in an insurance claim request that was made for damage 908b.

In some embodiments, the UAV 902 may transmit all captured damage inspection data to the insurance server. The insurance server may process all information collected by the UAV 902 to detect whether there is any damage to the real estate property. If the insurance server identifies that at least one aspect of the real estate property 904 has been damaged, the insurance server may determine whether the insurance policy of the insurance policyholder associated with real estate property 904 covers the identified damage. If such damage is not covered, the insurance server may notify the insurance policyholder that their current policy does not cover such type of identified damage. However, if the insurance server determines that the current insurance policy covers such damage, the identified damage may be examined further to determine a payment amount to provide the insurance policyholder or a repairman to cover the cost of repairing such damage.

In some embodiments, once an insurance server identifies that the type of damage is covered by the insurance policy, the insurance server may instruct the UAV 902 to collect data on the identified damage using one or more of its onboard sensors from multiple different vantage points. The insurance server may instruct the UAV 902 to perform multiple different tests to capture as much data as possible for the identified damage. For example, once the insurance server identifies that the roof of the real estate property has sustained damage 908b, the insurance server may instruct the UAV 902 to use its chemical sensors to detect if any gas leaks have occurred due to the roof damage. The insurance server may also instruct the UAV 902 to use its hyperspectral image sensor to detect if there is any rotting or pest infestation as a result of the roof damage 908b. The insurance server 908b may instruct the UAV 902 to use its pressure sensors to detect whether any air vents near the damaged roof area are still properly venting air. The insurance server may instruct the UAV 902 to perform additional tests for any other damage in this manner and measure such types of different data once it detects that the real estate property 904 is damaged and that the damage is covered under the insurance policyholder's policy.

In some embodiments, upon identifying all damages to real estate property 904 and collecting detailed inspection information about the condition of the real estate property 904 using UAV 902, the insurance server may determine the monetary amount to approve for insurance claim payment for repairing the damage(s) incurred to the insured real estate property 904. The insurance server may measure the extent and severity of each damaged aspect of the real estate property 904. For each identified damage, the insurance server may consider if there are any limits to the amount of money that can be disbursed and if the captured information triggers a special case to such limits which may allow additional money beyond the typical range of payment to be disbursed.

Figure 10:
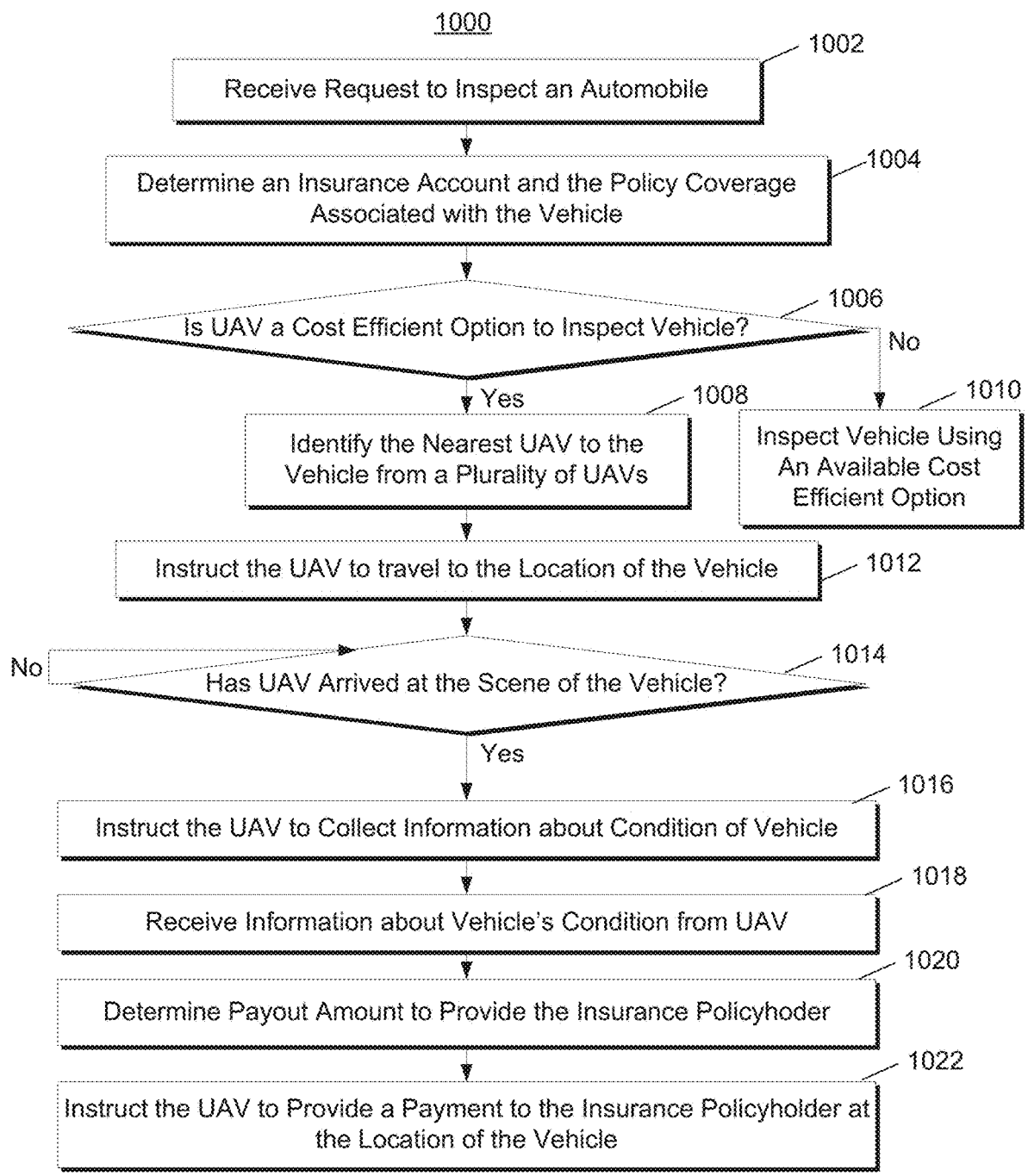
FIG. 10 is a flow chart illustrating an example method of collecting damage information from an insured vehicle for insurance claims processing according to one or more aspects described herein.

FIG. 10 is a flow chart illustrating an example method 1000 of collecting damage information from an insured vehicle for insurance claims processing. In some embodiments, the steps of method 1000 may be performed by a remote server such as server 206 of FIG. 2, insurance server 304 of FIG. 3, insurance server 406 of FIG. 4, and insurance server 502 of FIG. 5, and insurance server 716 of FIG. 7. In other embodiments, the steps of method 1000 may be performed in part by such a remote server and in part by a UAV such as UAV 204 of FIG. 2, UAV 302 of FIG. 3, UAV 412 of FIG. 4, any one of UAVs 506, 508, 510, and 512 of FIG. 5, and UAV 608 of FIG. 6, UAV 702 of FIG. 7, and UAV 902 of FIG. 9.

At step 1002, a request may be received by the insurance server to inspect a vehicle. Such a request may be received at the insurance server from the insurance policyholder through a mobile application of the insurance policyholder. Additionally or alternatively, such a request may be received as the insurance policyholder calls the insurance company and/or files an insurance claim. Additionally or alternatively, such a request may be received by an insurance server if a traffic police report indicates that the insured vehicle has been involved in an accident. Additionally or alternatively, such a request may be received by the insurance server if another driver claims that he has been involved in an accident with the insured vehicle. Any sources of information that alert the insurance server that a vehicle is damaged may trigger steps 1004-1022 of method 1000 to occur.

At step 1004, an insurance server may determine an insurance account and policy coverage associated with the vehicle. The insurance server may use the details provided in the request and/or notification to the insurance server identifying property damage (e.g., vehicle name, license plate number, insurance policy number, vehicle registration number, etc.) to identify the insurance policy account and/or the details of the insurance policy coverage for that insured vehicle. The insurance server may input the details found in the received request against an insurance database to identify the appropriate insurance account and/or insurance policy coverage.

At step 1006, the insurance server may determine whether dispatching a UAV is the most cost efficient available option to inspect vehicle. The insurance server may determine, based on the current location and accessibility of the vehicle, which available methods are available to collect data about the condition of the vehicle. For example, some exemplary methods that the insurance server may use may be dispatching an insurance agent to the vehicle's location, dispatching a UAV to the vehicle's location, and requesting the insurance policyholder to upload images of the vehicle using his mobile device. By weighing the costs and benefits of each available option with the details of the current situation (e.g., availability of resources, location, and accessibility of the vehicle), the insurance server may determine whether dispatching a UAV is the most cost efficient option available to inspect the vehicle.

At step 1008, in response to determining that dispatching the UAV is the most cost efficient available option, the insurance server may identify the UAV nearest to the location of the vehicle. The insurance server may have access to a continuously updated database with locations of each of a plurality of UAVs' current locations. Each UAV may provide its current location periodically to such a database and/or the insurance server. The insurance server may identify which available UAV is located nearest the current location of the vehicle.

At step 1010, in response to determining that dispatching the UAV is not the most cost efficient available option, the insurance server may choose to use the more cost efficient option to inspect the vehicle. For example, if the insurance policyholder is at the scene of the vehicle and can provide all the details about the condition of the vehicle along with supporting proof, then the insurance server may choose to exercise that resource instead of dispatching a UAV that may provide the same information.

At step 1012, the insurance server may instruct the UAV to travel to the location of the vehicle. The insurance server, or the UAV itself, may calculate a trajectory from the current location of the UAV to the location of the vehicle. Such a trajectory may be calculated so that the UAV flies over other insurance policyholders' properties to collect information on the condition of these properties that the UAV flies over as described in FIG. 9. Additionally or alternatively, the trajectory may be calculated to avoid obstructions and/or restricted airspace.

At step 1014, it may be determined whether the UAV has reached the location of the vehicle. The insurance server may continuously monitor the location of the UAV as it is en route to the vehicle to determine whether the UAV has reached its target. Additionally or alternatively, the UAV may transmit a message to the insurance server when it has reached its target destination (e.g., the location of the vehicle).

At step 1016, in response to determining that the UAV has reached the vehicle, the insurance server may instruct the UAV to collect information about the condition of the vehicle. The insurance server may instruct the UAV to collect information on or more aspects of the vehicle based on the received request. Additionally or alternatively, the UAV may perform a detailed inspection of the vehicle according by performing a list of inspection tests using one or more its onboard sensors as described above with relation to FIGS. 2 and 4-7. The UAV may coordinate such an inspection with a person at the location of the vehicle such as mechanic or the driver of the vehicle to capture as much information as possible.

At step 1018, the insurance server may receive information about the condition of the vehicle from the UAV. The UAV may transmit the data that it is collecting to the insurance server over a wireless network (e.g., Internet, GPS, cellphone network, radio waves, etc.) such that the insurance server may receive real-time accident collection information. Accordingly, the insurance server may process the received information and identify the damages inflicted on the vehicle in real time. Based on the received data, the insurance server may instruct the UAV to conduct further tests using one or more of its onboard sensors.

At step 1020, the insurance server may determine a payout amount to provide the insurance policyholder. Upon receiving the results of the damage inspection from the UAV, the insurance server may calculate a payout amount to provide the insurance policyholder or a repair shop to cover the costs of repairing the damage to the vehicle. Such a payout determination may be made by evaluating the information collected by the UAV, the past account history of the insurance policyholder (e.g., whether the damage to the vehicle is caused based on a faulty part that the policyholder had been requested to fix one or more times), and based on the amount of policy coverage and the rules associated with the policy coverage of the insured vehicle.

In step 1022, the insurance server may instruct the UAV to provide a payment to the insurance policyholder at the location of the vehicle. Upon calculating the sum of the payment to be provided to the policyholder, the insurance server may instruct the UAV to drop a debit card or check for the calculated amount to the policyholder if he is detected to be near the UAV. Additionally or alternatively, such a debit card or check may be mailed or electronically credited to the policyholder.

Although the steps of method 800 have been described within the context of a vehicle being the insured property, the same principles described above with relation method 800 may extend to other types of insured property. For example, an insurance server may dispatch a UAV to inspect the condition of any other type of insured property according to the techniques described above with relation to the insured vehicle that is inspected by the UAV.

Figure 11:
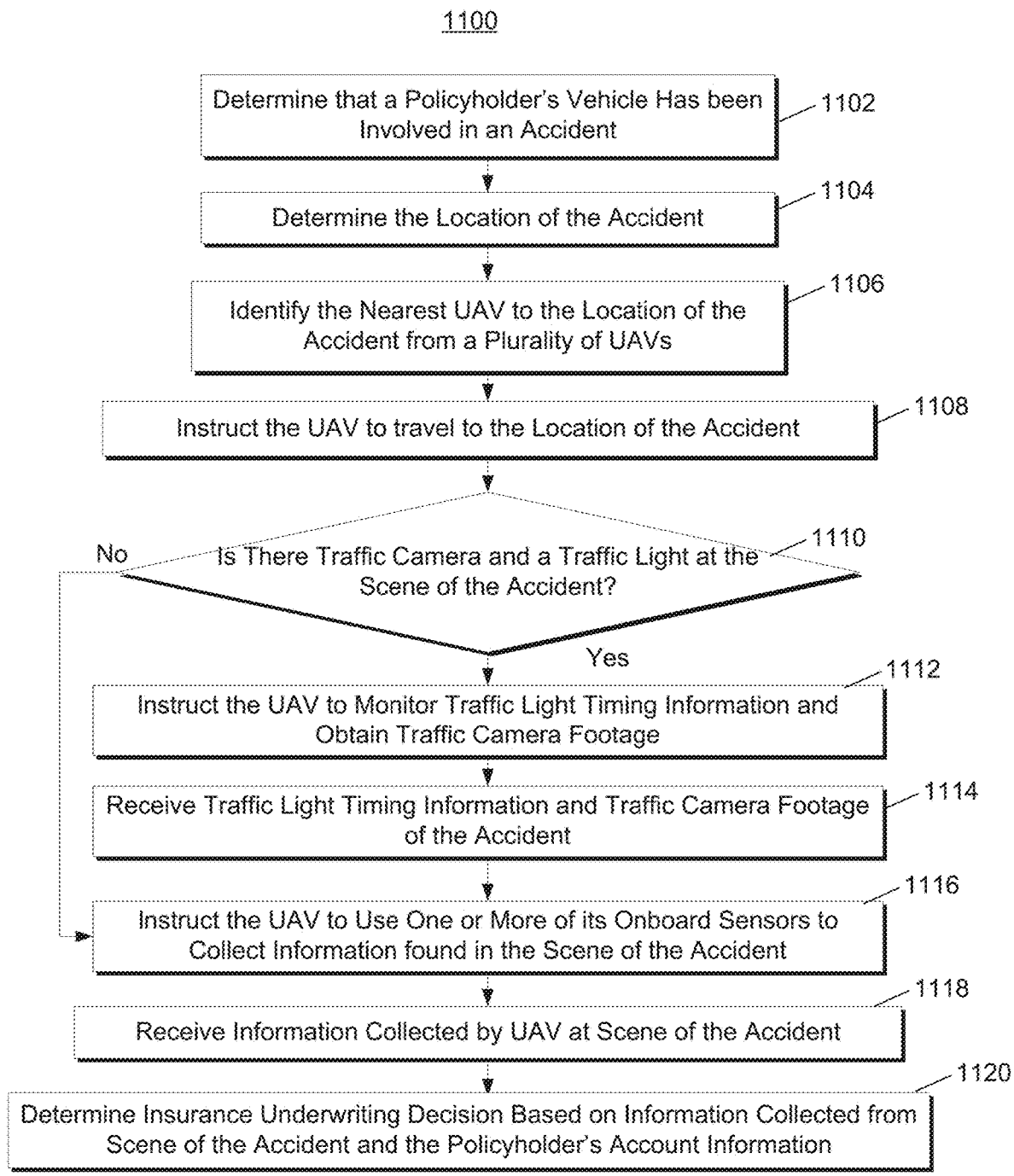
FIG. 11 is a flow chart illustrating an example method of performing scene investigation for an insured vehicle for insurance claims processing according to one or more aspects described herein.

FIG. 11 is a flow chart illustrating an example method 1100 of performing scene investigation for an insured vehicle for insurance claims processing. In some embodiments, the steps of method 1100 may be performed by a remote server such as server 206 of FIG. 2, insurance server 304 of FIG. 3, insurance server 406 of FIG. 4, and insurance server 502 of FIG. 5, and insurance server 716 of FIG. 7. In other embodiments, the steps of method 1100 may be performed in part by such a remote server and in part by a UAV such as UAV 204 of FIG. 2, UAV 302 of FIG. 3, UAV 412 of FIG. 4, any one of UAVs 506, 508, 510, and 512 of FIG. 5, and UAV 608 of FIG. 6, UAV 702 of FIG. 7, and UAV 902 of FIG. 9.

At step 1102, the insurance server may determine that a policyholder's vehicle has been involved in an accident. Such a determination may be made once an insurance policyholder files a claim request for an accident through a mobile application of his mobile device. Additionally or alternatively, such a determination may be made once the insurance policyholder calls the insurance company and files an insurance claim and/or calls to request aid for an accident. Additionally or alternatively, such a determination may be made by determining from news or traffic police sources that an accident involving an insured policyholder has occurred. Additionally or alternatively, such a determination may be made by the insurance server if another driver claims that he has been involved in an accident with the insured vehicle by contacting the insurance company.

At step 1104, an insurance server may determine the location of the accident. The location may be determined from the original source of information (e.g., the policyholder's call, the location of the policyholder's mobile device, the traffic police report, etc.). Additionally or alternatively, the vehicle may transmit a distress signal and/or its location to an insurance server.

At step 1106, the insurance server may identify the UAV nearest to the location of the vehicle. The insurance server may have access to a continuously updated database with locations of each of a plurality of UAVs' current locations. Each UAV may provide its current location periodically to such a database and/or the insurance server. The insurance server may identify which available UAV is located nearest the location of the vehicle.

At step 1108, the insurance server may instruct the UAV to travel to the location of the vehicle. The insurance server, or the UAV itself, may calculate a trajectory from the current location of the UAV to the location of the vehicle. Such a trajectory may be calculated so that it flies over other insurance policyholders' properties that the UAV may capture overhead flyby data for as part of a routine flyby as described in FIG. 9. The trajectory may be calculated to avoid obstructions and/or restricted airspace.

At step 1110, the insurance server may determine whether there are any traffic signals and/or traffic cameras at the scene of the accident (e.g., location of the accident). The UAV may use its cameras to detect such traffic cameras and/or traffic light signals when it reaches the scene of the accident and may identify any identifying information (e.g., serial number of the traffic light and/or traffic camera) which may be helpful in retrieving data from them. Additionally or alternatively, the insurance server may query a database of traffic lights and/or traffic cameras using the location of the accident to identify any nearby traffic cameras and/or traffic lights near the accident scene. If no such traffic cameras and traffic light signals are found, the method 1100 may proceed to step 1116 to monitor instruct the UAV to collect information about the scene of the accident using its one or more onboard sensors.

At step 1112, in response to determining that there is at least one traffic light and/or traffic camera at the scene of the accident, the insurance server may instruct the UAV to monitor the traffic light timing and retrieve traffic camera footage of the accident. As discussed above in greater detail with relation to FIG. 6, the UAV and/or the insurance server may request to receive a video feed and/or images of the traffic intersection at the time of the accident. For example, the UAV may communicate over wireless internet or Bluetooth or any other network with the traffic camera to retrieve images taken during the time of the accident. Additionally or alternatively, the insurance server may request a central traffic camera server to obtain footage from the identified traffic camera during a particular time of the accident. The UAV may be instructed by the insurance server to monitor the traffic light signal to determine the amount of time it takes for the traffic light signal to switch between different signals. The insurance server may use such traffic light timing information to accurately predict the traffic signal that must have been displayed by the traffic light signal at any given point of time.

At step 1114, the insurance server may receive traffic light timing information and the traffic camera footage. For example, the UAV may transmit such information to the insurance. Additionally or alternatively, the insurance server may receive traffic camera footage at the time of the accident from a central traffic camera database. The insurance server may be able to correlate the accident footage obtained from the traffic camera with the signal that the traffic light signal should be displaying to identify whether the driver of one or more vehicles was performing a traffic violation before the accident. If the traffic camera footage shows one or more vehicle committing a traffic violation, the insurance server may be able to able to partially or fully apportion fault to that corresponding vehicle.

At step 1116, the insurance server may instruct the UAV to collect information about the accident scene. Such information may include determining the condition of the vehicle and any other vehicles and inspecting the road and nearby area to gather clues about the accident. The insurance server may instruct the UAV to collect information on or more aspects of the insured vehicle. Additionally or alternatively, the UAV may perform a detailed inspection of the vehicle according by performing a list of inspection tests using one or more its onboard sensors as described above with relation to FIGS. 2 and 4-7. The UAV may coordinate such an inspection with a person at the location of the vehicle such as mechanic or the driver of the vehicle to capture as much information as possible.

At step 1118, the insurance server may receive information collected from the scene of the accident from the UAV. The UAV may transmit the data that it is collecting to the insurance server over a wireless network (e.g., Internet, GPS, cellphone network, radio waves, etc.) such that the insurance server may receive real-time accident collection information. Accordingly, the insurance server may process the received information and identify the damages inflicted on the vehicle in real time. Based on the received data, the insurance server may instruct the UAV to conduct further tests using one or more of its onboard sensors.

At step 1020, the insurance server may determine an insurance underwriting decision based on the information collected at the scene of the accident and the policyholder's account information. Upon receiving the results of the damage inspection from the UAV, the insurance server may calculate a payout amount to provide the insurance policyholder or a repair shop to cover the costs of repairing the damage to the vehicle. Such a payout determination may be made by evaluating the information collected by the UAV, the past account history of the insurance policyholder (e.g., whether the damage to the vehicle is caused based on a faulty part that the policyholder had been requested to fix one or more times), and based on the amount of policy coverage and the rules associated with the policy coverage of the insured vehicle. Based on the traffic light timing information and the traffic camera footage, the insurance server and/or an accident investigator working with the insurance company who examines such information gathered by the insurance server, may determine whether the insurance policyholder is partially or completely at fault for the accident and may accordingly adjust the payout amount. If the insurance server determines that the insurance policyholder is partially at fault (e.g., either based on the traffic camera footage, traffic light timing information, information collected by the UAV from the scene of the accident, or faulty vehicle components that the policyholder had neglected to repair in a timely manner), the insurance server may increase/decrease the insurance premium of the policyholder and/or adjust the insurance payout amount accordingly.

Figure 12:
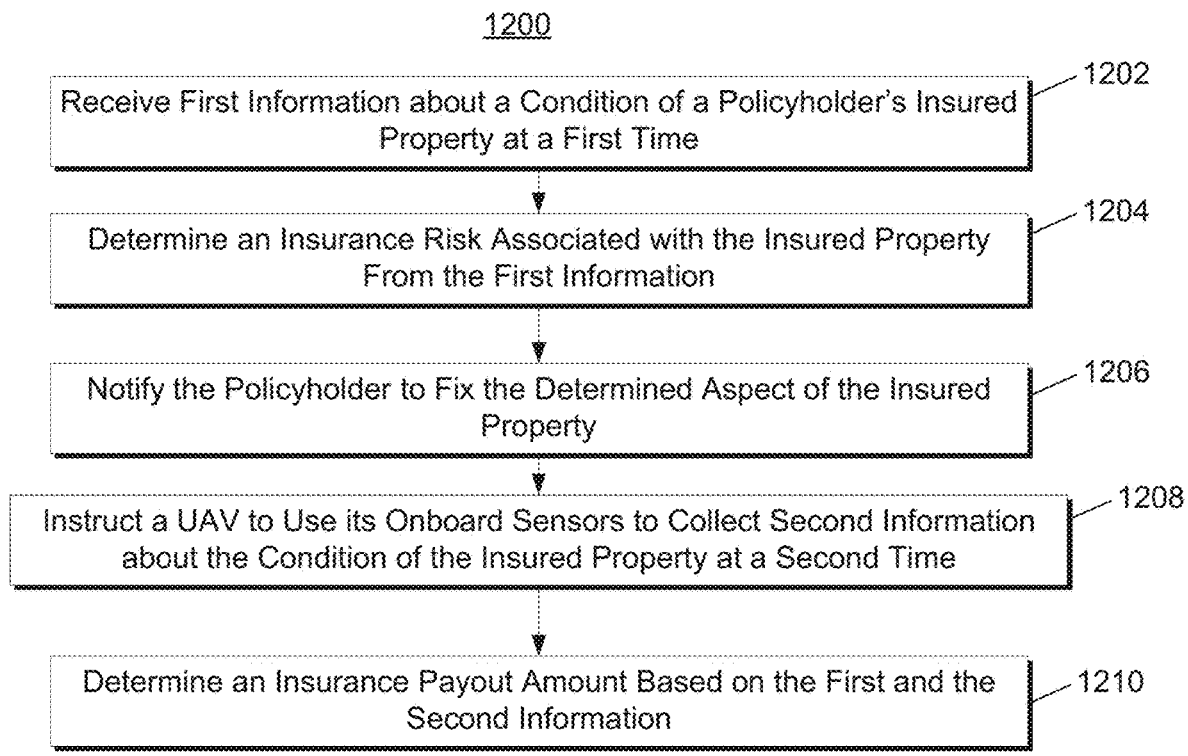
FIG. 12 is a flow chart illustrating an example method of collecting damage information and assessing insurance risk for insurance claims processing according to one or more aspects described herein.

FIG. 12 is a flow chart illustrating an example method 1200 of collecting damage information and assessing insurance risk for insurance claims processing. In some embodiments, the steps of method 1200 may be performed by a remote server such as server 206 of FIG. 2, insurance server 304 of FIG. 3, insurance server 406 of FIG. 4, and insurance server 502 of FIG. 5, and insurance server 716 of FIG. 7. In other embodiments, the steps of method 1200 may be performed in part by such a remote server and in part by a UAV such as UAV 204 of FIG. 2, UAV 302 of FIG. 3, UAV 412 of FIG. 4, any one of UAVs 506, 508, 510, and 512 of FIG. 5, and UAV 608 of FIG. 6, UAV 702 of FIG. 7, and UAV 902 of FIG. 9.

At step 1202, the insurance server may receive first information about the condition of a policyholder's insured property at the first time. The insured property may be a real estate property or a vehicle or any other piece of property that an insurance policyholder may have insured. The first information about the condition of the insured property may be received by the insurance server from a routine flyover of a UAV over the property. Such flyby data may be captured by the UAV while it is passing over the insured property en route to inspect the condition of another insured property. Additionally or alternatively, such first information may be received the last time an appraiser or mechanic inspected the insured property and transmitted a report to the insurance company. Additionally or alternatively, the first information may have been received by the automobile through a mobile device as the insurance policyholder uploaded images and data to the insurance server about the insured property.

At step 1204, the insurance server may determine an insurance risk associated with the insured property from the first information. From the available first information, the insurance server may identify the condition of the insured property and identify any potential insurance risks posed by any elements of the insured property. For example, insurance server may determine from a photograph or satellite image of an insured house that the roof of the house is dangerously close to one or more tall trees that could fall and damage the house during a storm. As another example, the insurance server may determine from images of an insured automobile that the rear brake lights are not working. Such information may be analyzed to identify any risks posed to the insured property by the insurance server. The insurance server may have a checklist of insurance risks for each type of insured property that it may use to process the first information to identify any detectable insurance risks. The insurance server may be able to identify insurance risks by considering different types of measurements and data from more than one sensor of the UAV. For example, the insurance server may consider both chemical sensor test results along with hyperspectral image data and photographs to determine that a vehicle's brake pad is rusting, thereby posing an insurance risk to the vehicle, and needs to be replaced.

At step 1206, the insurance server may notify the policyholder to fix the aspect of the insured property. The insurance server may identify and notify the policyholder of the insured property to repair the aspect of the insured property that poses an insurance risk. The insurance server may call, mail, email, or send a message to the policyholder's mobile device to notify the policyholder to take such corrective measures.

At step 1210, the insurance server may instruct the UAV to use its onboard sensors to collect second information about the condition of the insured property at a second time. At a second time when either an insurance claims request for the insured property is received by the insurance server or when the insurance server detects that the insured property has been damaged, the insurance server may dispatch a UAV to collect information about the condition of the insured property using its one or more onboard sensors. The insurance server may asses the condition of the insured property as it receives the information from the UAV.

At step 1212, the insurance server may determine an insurance payout amount based on the first and the second information. As the insurance server analyzes the second information about the condition of the insured property at the second time, the insurance server may identify whether the user has fixed the insurance risks that were identified at the first time. If the insurance risks have not been fixed, the insurance server may determine whether any damage to the insured property that has been collected at the second time is at least partially a function of a previously identified insurance risk. If the insurance server determines that the damage is a function of neglecting to fix the aspects posing an insurance risk, the insurance server may reduce the insurance payment amount that the insurance policyholder would have been otherwise eligible to receive, had he fixed the aspect of the insured property determined to pose an insurance risk. Additionally or alternatively, the insurance server may increase the insurance premium price upon such a determination.

Figure 13:
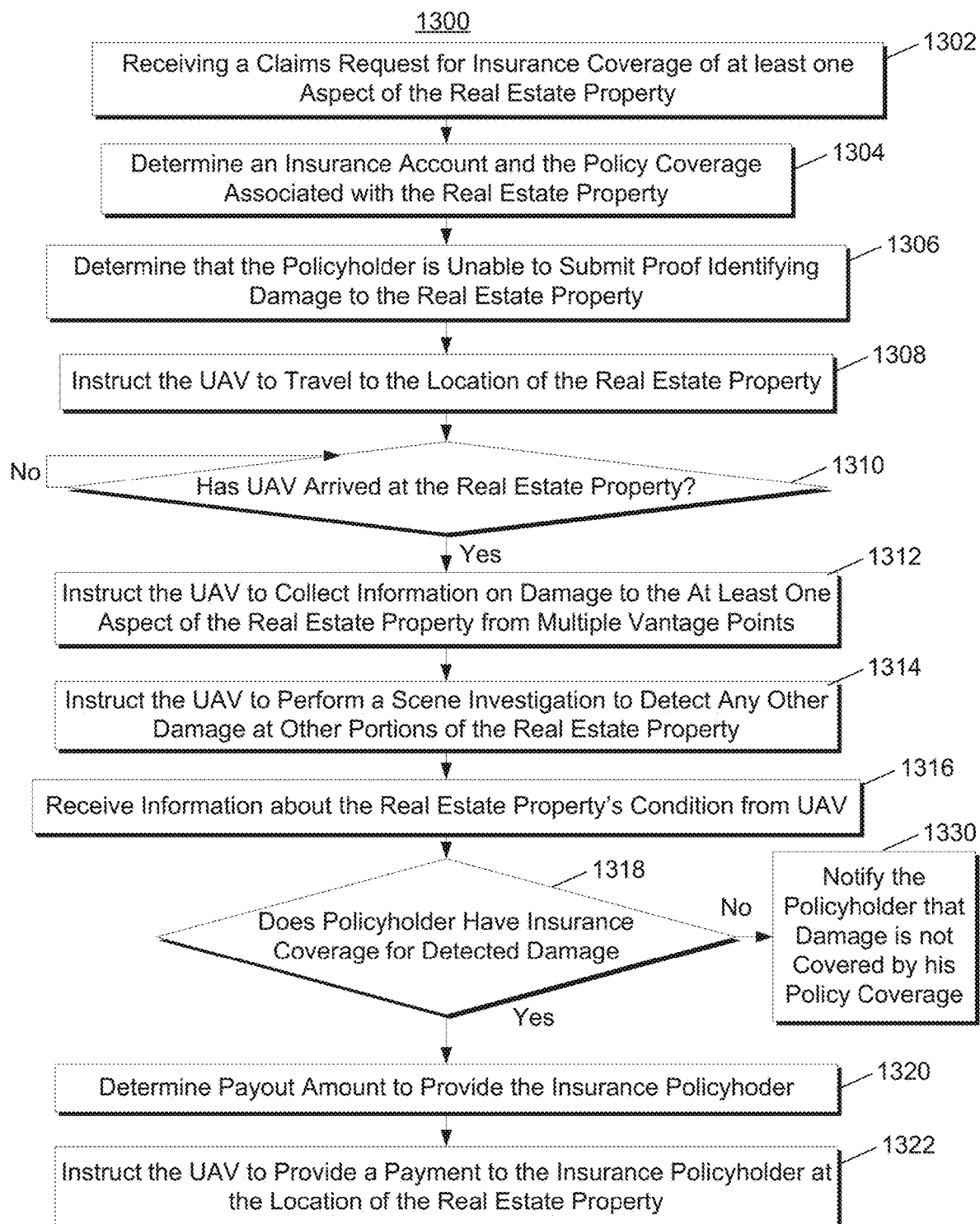
FIG. 13 is a flow chart illustrating an example method of collecting damage information from an insured real estate property for insurance claims processing according to one or more aspects described herein.

FIG. 13 is a flow chart illustrating an example method 1300 of collecting damage information from an insured real estate property for insurance claims processing according to one or more aspects described herein. In some embodiments, the steps of method 1300 may be performed by a remote server such as server 206 of FIG. 2, insurance server 304 of FIG. 3, insurance server 406 of FIG. 4, and insurance server 502 of FIG. 5, and insurance server 716 of FIG. 7. In other embodiments, the steps of method 1300 may be performed in part by such a remote server and in part by a UAV such as UAV 204 of FIG. 2, UAV 302 of FIG. 3, UAV 412 of FIG. 4, any one of UAVs 506, 508, 510, and 512 of FIG. 5, and UAV 608 of FIG. 6, UAV 702 of FIG. 7, and UAV 902 of FIG. 9.

At step 1302, an insurance claims request may be received by the insurance server for insurance coverage of at least one aspect of a real estate property. Such a request may be received by the insurance policyholder through a mobile application from the insurance policyholder. Additionally or alternatively, such a request may be received as the insurance policyholder calls the insurance company and files an insurance claim. Additionally or alternatively, such a request may be received by an insurance server if a traffic police report indicates that the insured vehicle has been involved in an accident. Additionally or alternatively, such a request may be received by the insurance server if another driver claims that he has been involved in an accident with the insured vehicle.

At step 1304, an insurance server may determine an insurance account and policy coverage associated with the real estate property. The insurance server may use the details provided in the request (e.g., address of the real estate property, property owner or occupant's name, the name of the policyholder, the insurance account number of the policyholder, etc.) to identify the insurance policy account and/or the details of the insurance policy coverage for that insured real estate property. The insurance server may input the details found in the received request against an insurance database to identify the appropriate insurance account and/or insurance policy coverage.

At step 1306, the insurance server may determine that the insurance policyholder is unable to provide proof identifying damage to the real estate property.

At step 1308, the insurance server may instruct a UAV to travel to the location of the real estate property. The insurance server, or the UAV itself, may calculate a trajectory from the current location of the UAV to the location of the real estate property. Such a trajectory may be calculated so that it flies over other insurance policyholders' properties that the UAV may capture overhead flyby data for as part of a routine flyby as described in FIG. 9. The trajectory may be calculated to avoid obstructions and/or restricted airspace.

At step 1310, it may be determined whether the UAV has reached the location of the real estate property. The insurance server may continuously monitor the location of the UAV as it is en route to the real estate property to determine whether the UAV has reached its target. Additionally or alternatively, the UAV may transmit a message to the insurance server when it has reached its target destination (e.g., the location of the real estate property).

At step 1312, in response to determining that the UAV has reached the real estate property, the insurance server may instruct the UAV to collect information about the condition of the at least one damaged aspect of the real estate property from multiple different vantage points. The insurance server may instruct the UAV to collect information on or more aspects of the real estate property based on the received request. Additionally or alternatively, the UAV may perform a detailed inspection of the real estate property according by performing a list of inspection tests using one or more its onboard sensors as described above with relation to FIG. 9. The UAV may coordinate such an inspection with a person at the location of the real estate property such as the occupant of the real estate property to capture as much information as possible.

At step 1314, the insurance server may instruct the UAV to perform scene investigation to detect any other damaged to other portions of the real estate property. The insurance server may instruct the UAV to fly around the real estate property and collect data for various aspects of the real estate property (e.g., yard, building structures, exposed wiring, roof, etc.) in addition to the portions that were reported as damaged in the insurance claims request and/or communication to the insurance server identifying the property damage according to the various embodiments described in FIG. 9 and the rest of the disclosure.

At step 1316, the insurance server may receive information about the condition of the real estate property from the UAV. The UAV may transmit the data that it is collecting to the insurance server over a wireless network (e.g., Internet, GPS, cellphone network, radio waves, etc.) such that the insurance server may receive real-time inspection information. Accordingly, the insurance server may process the received information and identify the damages inflicted on the real estate property in real time. Based on the received data, the insurance server may instruct the UAV to conduct further tests using one or more of its onboard sensors.

At step 1318, the insurance server may determine whether the policyholder has insurance coverage for the detected damage. The insurance server may identify the type of damage incurred to the real estate property from the information collected by the UAV. The insurance server may examine the policyholder's insurance coverage policy and determine whether the insurance policy covers the identified type of damage detected.

If the insurance server determines that the policyholder does not have such insurance coverage for at least one item of damage to the real estate property, the method 1300 may proceed to step 1330 to notify the policyholder that the at least one damage to the real estate property is not covered. The insurance server may identify the damage and an estimated out of pocket cost required to repair the damage not covered by the policyholder's coverage.

At step 1320, the insurance server may determine a payout amount to provide the insurance policyholder. Upon receiving the results of the damage inspection from the UAV, the insurance server may calculate a payout amount to provide the insurance policyholder or a repairman to cover the costs of repairing the damage to the real estate property. Such a payout determination may be made by evaluating the information collected by the UAV, the past account history of the insurance policyholder (e.g., whether the damage to the real estate property is caused based on a faulty part that the policyholder had been requested to fix one or more times), and based on the amount of policy coverage and the rules associated with the policy coverage of the insured real estate property.

In step 1322, the insurance server may instruct the UAV to provide a payment to the insurance policyholder at the location of the real estate property. Upon calculating the sum of the payment to be provided to the policyholder, the insurance server may instruct the UAV to drop a debit card or check for the calculated amount to the policyholder if he is detected to be near the UAV. Additionally or alternatively, such a debit card or check may be mailed or electronically credited to the policyholder.

Although the systems, methods, etc. described herein are generally described in the context of real estate and automobile insurance, the systems, methods, etc. may be used with various other types of insurance. For instance, UAVs may be deployed to assess damage after a natural disaster for natural disaster insurance, a separate insurance policy than the types of property insurance discussed above. Various aspects of the systems, methods, etc. described herein may be used with various types of insurance without departing from the spirit of the disclosure.

While the aspects described herein have been discussed with respect to specific examples including various modes of carrying out aspects of the disclosure, those skilled in the art will appreciate that there are numerous variations and permutations of the above described systems and techniques that fall within the spirit and scope of the disclosure. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the spirit of the disclosure.

What is claimed is:

1. A system comprising:
   an unmanned aerial vehicle (UAV) comprising one or more onboard sensors and an energy source to power the UAV;
   at least one processor and at least one memory storing instructions that, when executed by the at least one processor, cause the system to:
   determine that a vehicle needs to be inspected, wherein the determination to inspect the vehicle is made upon receiving an indication from a policyholder associated with the vehicle that the vehicle has been submitted to a repair shop;
   generate a flight trajectory to autonomously transport the UAV from a current location to a location of the vehicle;
   transmit the generated flight trajectory to the UAV;
   instruct the UAV to autonomously travel to the location of the vehicle along the generated flight trajectory;
   instruct the UAV to collect information about a condition of the vehicle using the one or more onboard sensors of the UAV;
   receive, from the UAV, a plurality of different types of information collected by the one or more onboard sensors;
   determine an amount of insurance payout to approve for repairs to the vehicle based on the information collected by the UAV;
   determine a location of the repair shop from the indication received from the policyholder;
   responsive to determining the location of the repair shop from the indication received from the policyholder, generate a second flight trajectory to autonomously transport the UAV from a currently location to the location of the repair shop;
   instruct the UAV to travel to the location of the repair shop along the second flight trajectory to assess damage of the vehicle before the vehicle is repaired;
   receive a report from the repair shop identifying the damages that the repair shop claims to have fixed in the vehicle; and determine that the report from the repair shop is claiming to have fixed one or more damage to the vehicle that is not identified in the information captured by the UAV about the condition of the vehicle before the vehicle was repaired.

2. The system of claim 1, wherein the instructions, when executed by the at least one processor, further cause the system to:

receive a claims request for the vehicle; and determine that instructing the UAV to collect the information about the condition of the vehicle is a cost effective option to respond to the claims request.

3. The system of claim 1, wherein the instructions, when executed by the at least one processor, further cause the system to:

determine the location of the vehicle based on global positioning system data from at least one of: the vehicle and a mobile device within the vehicle; and instruct the UAV to travel to the location of the vehicle.

4. The system of claim 1, wherein the instructions, when executed by the at least one processor, further cause the system to:

determine an insurance account with which the vehicle is associated;

identify an insurance policy coverage of the insurance account with respect to the vehicle; and determine which repairs are covered by the insurance policy coverage by examining the information collected by the UAV.

5. The system of claim 1, wherein the instructions, when executed by the at least one processor, further cause the system to:

receive a claims request for the vehicle;

determine an insurance account with which the vehicle is associated;

identify an insurance policy coverage of the insurance account with respect to the vehicle;

determine at least one aspect of the vehicle for which to capture detailed information based on the insurance policy coverage for the vehicle and the claims request; and instruct the UAV to use one or more of the onboard sensors to collect the detailed information for the at least one determined aspect of the vehicle.

* * * * *